(12) United States Patent
Khoshnevisan et al.

(10) Patent No.: US 11,588,523 B2
(45) Date of Patent: Feb. 21, 2023

(54) TPMI AND/OR SRI INDICATION FOR CODEBOOK-BASED PUSCH REPETITION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/247,601

(22) Filed: Dec. 17, 2020

(65) Prior Publication Data

US 2021/0226680 A1 Jul. 22, 2021

Related U.S. Application Data

(60) Provisional application No. 62/962,460, filed on Jan. 17, 2020.

(51) Int. Cl.
*H04J 13/18* (2011.01)
*H04B 7/0456* (2017.01)
(Continued)

(52) U.S. Cl.
CPC ......... *H04B 7/0456* (2013.01); *H04L 5/0048* (2013.01); *H04W 72/042* (2013.01); *H04J 13/18* (2013.01)

(58) Field of Classification Search
CPC . H04W 72/042; H04W 72/0446; H04W 4/70; H04W 72/0413; H04W 74/0833;
(Continued)

(56) References Cited

U.S. PATENT DOCUMENTS 9,258,048 B2 * 2/2016 Li .................... H04L 1/0026
2019/0174466 A1 6/2019 Zhang et al.
(Continued)

FOREIGN PATENT DOCUMENTS

| EP | 2723012 A1 | 4/2014 |
| WO | 2018182381 A1 | 10/2018 |
| WO | 2020045003 A1 | 3/2020 |

OTHER PUBLICATIONS

Huawei, et al., "Other issues on NR eMIMO in R16", 3GPP TSG RAN WG1 Meeting #99, 3GPP Draft; R1-1912920, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, 4 Pages, Nov. 9, 2019 (Nov. 9, 2019), XP051823683, Retrieved from the Internet: URL: https://ftp.3gpp.org/tsg_ran/WG1_RL1/TSGR1_99/Docs/R1-1912920.zip R1-1912920.docx [retrieved on Nov. 9, 2019] section 2.2.
(Continued)

*Primary Examiner* — Eva Y Puente
(74) *Attorney, Agent, or Firm* — Harrity & Harrity, LLP

(57) ABSTRACT

Various aspects of the present disclosure generally relate to wireless communication. In some aspects, a user equipment (UE) may receive a downlink communication that includes one or more codepoints indicating a plurality of transmit precoder matrix indicator (TPMI) indices and/or a sounding reference signal (SRS) resource indicator (SRI) codepoint indicating one or more SRS resources. The UE may identify, based at least in part on the one or more codepoints, one or more TPMI indices, of the plurality of TPMI indices, for one or more repetitions of a codebook-based PUSCH transmission and/or may identify, based at least in part on the SRI codepoint, one or more SRS resources for the one or more repetitions. Numerous other aspects are provided.

30 Claims, 13 Drawing Sheets

(51) Int. Cl.
*H04L 5/00* (2006.01)
*H04W 72/04* (2023.01)

(58) Field of Classification Search
CPC ............. H04W 72/14; H04W 72/1268; H04W 72/1289; H04L 5/0053; H04L 1/08; H04L 5/0055; H04L 5/0044; H04L 5/0094; H04L 5/0007; H04L 1/189; H04L 5/0048; H04L 1/1812; H04J 13/18; H04J 11/00; H04J 13/0062; H04J 13/004; H04J 11/0079; H04J 11/0073; H04J 13/0059; H04J 1/02; H04J 13/0003; H04B 1/713; H04B 7/0695; H04B 7/0626; H04B 7/0456; H04B 7/088; H04B 17/318; H04B 1/7143; H04B 17/309
USPC ......................................................... 370/329
See application file for complete search history.

(56) References Cited

U.S. PATENT DOCUMENTS

2021/0044385 A1* 2/2021 Hosseini .............. H04B 7/0456
2021/0337534 A1* 10/2021 Xiong .................. H04B 7/0639

OTHER PUBLICATIONS

International Search Report and Written Opinion—PCT/US2020/070937—ISA/EPO—Mar. 18, 2021.

* cited by examiner

| Index (Codepoint Value) | Mapping |
|---|---|
| 0 | 1 layer: TPMI=(0,0) |
| 1 | 1 layer: TPMI=(0,1) |
| 2 | 1 layer: TPMI=(0,2) |
| 3 | 1 layer: TPMI=(0,3) |
| 4 | 1 layer: TPMI=(1,0) |
| 5 | 1 layer: TPMI=(1,1) |
| 6 | 1 layer: TPMI=(1,2) |
| 7 | 1 layer: TPMI=(1,3) |
| ... | ... |
| 15 | 2 layers: TPMI=(0,0) |
| 16 | 2 layers: TPMI=(0,1) |
| ... | ... |

FIG. 3B

| Index (SRI Codepoint Value) | # of SRS resources=2 | # of SRS resources=3 | # of SRS resources=4 |
|---|---|---|---|
| 0 | 0 | 0 | 0 |
| 1 | 1 | 1 | 1 |
| 2 | 0,1 | 2 | 2 |
| 3 | 1,0 | 0,1 | 3 |
| 4 |  | 0,2 | 0,1 |
| 5 |  | 1,0 | 0,2 |
| 6 |  | 1,2 | 0,3 |
| 7 |  | 2,0 | 1,0 |
| 8 |  | 2,1 | 1,2 |
| 9 |  |  | 1,3 |
| 10 |  |  | 2,0 |
| ... | ... | ... | ... |

FIG. 3C

TPMI AND/OR SRI INDICATION FOR CODEBOOK-BASED PUSCH REPETITION

CROSS-REFERENCE TO RELATED APPLICATION

This patent application claims priority to U.S. Provisional Patent Application No. 62/962,460, filed on Jan. 17, 2020, entitled "TPMI AND/OR SRI INDICATION FOR CODEBOOK-BASED PUSCH REPETITION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for transmit precoder matrix indicator (TPMI) and/or sounding reference signal resource indicator (SRI) indication for codebook-based physical uplink shared channel (PUSCH) repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a downlink communication that includes one or more codepoints indicating a plurality of transmit precoder matrix indicator (TPMI) indices; and identifying, based at least in part on the one or more codepoints, a first TPMI index, of the plurality of TPMI indices, for a first repetition of a physical uplink shared channel (PUSCH) transmission, wherein the PUSCH transmission is a codebook-based PUSCH transmission.

In some aspects, a UE for wireless communication may include memory and one or more processors operatively coupled to the memory. The memory and the one or more processors may be configured to receive a downlink communication that includes one or more codepoints indicating a plurality of TPMI indices; and identify, based at least in part on the one or more codepoints, a first TPMI index, of the plurality of TPMI indices, for a first repetition of a PUSCH transmission, wherein the PUSCH transmission is a codebook-based PUSCH transmission.

In some aspects, a non-transitory computer-readable medium may store one or more instructions for wireless communication. The one or more instructions, when executed by one or more processors of a UE, may cause the one or more processors to receive a downlink communication that includes one or more codepoints indicating a plurality of TPMI indices; and identify, based at least in part on the one or more codepoints, a first TPMI index, of the plurality of TPMI indices, for a first repetition of a PUSCH transmission, wherein the PUSCH transmission is a codebook-based PUSCH transmission.

In some aspects, an apparatus for wireless communication may include means for receiving a downlink communication that includes one or more codepoints indicating a plurality of TPMI indices; and means for identifying, based at least in part on the one or more codepoints, a first TPMI index, of the plurality of TPMI indices, for a first repetition of a PUSCH transmission, wherein the PUSCH transmission is a codebook-based PUSCH transmission.

In some aspects, a method for wireless communication, performed by a UE, may include receiving a downlink communication that schedules a first set of repetitions of a PUSCH transmission associated with a first uplink beam and a second set of repetitions of the PUSCH transmission associated with a second uplink beam; configuring respective redundancy versions for the first set of repetitions based at least in part on a first redundancy version sequence associated with the first uplink beam; and configuring respective redundancy versions for the second set of repetitions based at least in part on a second redundancy version sequence associated with the second uplink beam.

In some aspects, a UE for wireless communication may include memory and one or more processors operatively coupled to the memory. The memory and the one or more processors may be configured to receive a downlink communication that schedules a first set of repetitions of a PUSCH transmission associated with a first uplink beam and a second set of repetitions of the PUSCH transmission associated with a second uplink beam; configure respective redundancy versions for the first set of repetitions based at least in part on a first redundancy version sequence associated with the first uplink beam; and configure respective redundancy versions for the second set of repetitions based at least in part on a second redundancy version sequence associated with the second uplink beam.

In some aspects, a non-transitory computer-readable medium may store one or more instructions for wireless communication. The one or more instructions, when executed by one or more processors of a UE, may cause the one or more processors to receive a downlink communication that schedules a first set of repetitions of a PUSCH transmission associated with a first uplink beam and a second set of repetitions of the PUSCH transmission associated with a second uplink beam; configure respective redundancy versions for the first set of repetitions based at least in part on a first redundancy version sequence associated with the first uplink beam; and configure respective redundancy versions for the second set of repetitions based at least in part on a second redundancy version sequence associated with the second uplink beam.

In some aspects, an apparatus for wireless communication may include means for receiving a downlink communication that schedules a first set of repetitions of a PUSCH transmission associated with a first uplink beam and a second set of repetitions of the PUSCH transmission associated with a second uplink beam; means for configuring respective redundancy versions for the first set of repetitions based at least in part on a first redundancy version sequence associated with the first uplink beam; and means for configuring respective redundancy versions for the second set of repetitions based at least in part on a second redundancy version sequence associated with the second uplink beam.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3G are diagrams illustrating one or more examples of transmit precoder matrix indicator (TPMI) and/or sounding reference signal resource indicator (SRI) indication for codebook-based physical uplink shared channel (PUSCH) repetition, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
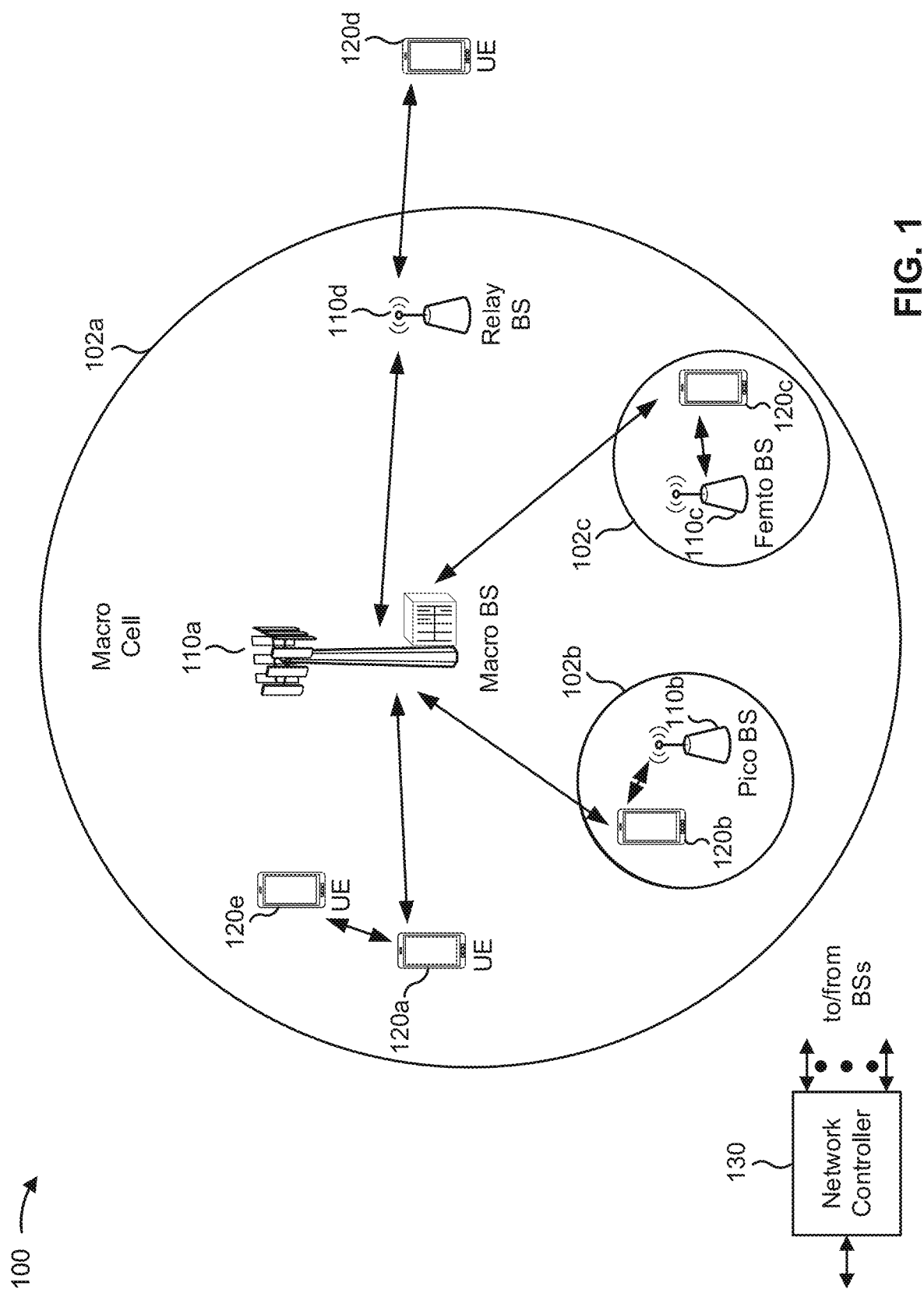
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
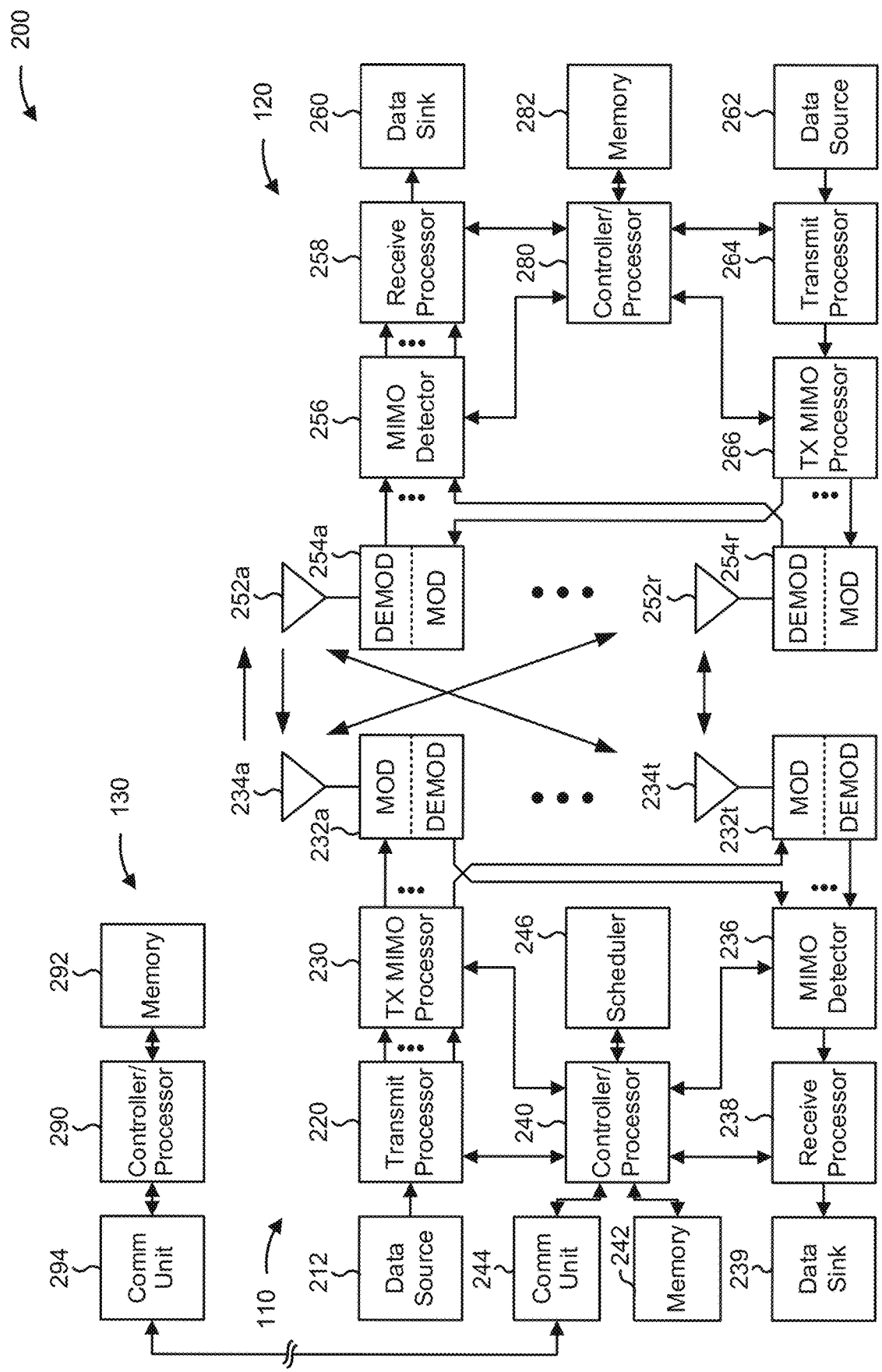
FIG. 2 is a diagram illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmit precoder matrix indicator (TPMI) and/or sounding reference signal resource indicator (SRI) indication for codebook-based physical uplink shared channel (PUSCH) repetition, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for receiving a downlink communication that includes one or more codepoints indicating a plurality of TPMI indices, means for identifying, based at least in part on the one or more codepoints, a first TPMI index, of the plurality of TPMI indices, for a first repetition of a physical uplink shared channel (PUSCH) transmission, wherein the PUSCH transmission is a codebook-based PUSCH transmission, and/or the like. In some aspects, the UE 120 includes means for receiving a downlink communication that schedules a first set of repetitions of a PUSCH transmission associated with a first uplink beam and a second set of repetitions of the PUSCH transmission associated with a second uplink beam, means for configuring respective redundancy versions for the first set of repetitions based at least in part on a first redundancy version sequence associated with the first uplink beam, means for configuring respective redundancy versions for the second set of repetitions based at least in part on a second redundancy version sequence associated with the second uplink beam, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

As indicated above, a BS may schedule or configure uplink transmissions for a UE on an uplink. In some cases, the BS may configure the UE to perform a codebook-based PUSCH transmission, which may be a PUSCH transmission that is configured to be performed in a sounding reference signal (SRS) resource set with a usage of 'codebook' configured for the UE. The SRS resource set may include N SRS resources (e.g., where N=1, 2, 3, or 4), and the BS may configure the quantity of SRS ports and spatial relation information for each of the SRS resources on a per-SRS resource basis.

The spatial relation information for an SRS resource may indicate a reference signal index (e.g., a synchronization signal block (SSB), a channel state information reference signal (CSI-RS), or another SRS resource) for transmission of the SRS resource (and thus, the associated PUSCH transmission). The UE may use the same spatial domain transmission filter as the reference signal indicated in the spatial relation information (spatialRelationInfo), which may effectively be an uplink beam for the PUSCH transmission.

The BS may indicate, to the UE, an SRS resource for a PUSCH transmission by indicating the SRS resource in an SRS resource indicator (SRI) field in a downlink communication (e.g., a downlink control information (DCI) communication with a format 0_1, which may be an uplink scheduling DCI) that schedules the PUSCH transmission. The UE may use the same spatial domain transmission filter for the PUSCH transmission as the indicated SRS resource, and may use the quantity of SRS ports of the indicated SRS resource as the quantity of antenna ports for the PUSCH transmission.

In some cases, the downlink communication may further indicate a TPMI and a quantity of layers for the PUSCH transmission. For example, if the downlink communication is a DCI communication, the DCI communication may include a Precoding Information and Number of Layers field that indicates the TPMI and the quantity of layers. The Precoding Information and Number of Layers field may include a codepoint (e.g., a plurality of bits indicating or representing a particular value) that identifies an index associated with a row or column in a table or another type of data structure. The row or column may indicate the quantity of layers and the TPMI that are associated with the index.

In some cases, the size of the field may be based at least in part on the quantity of antenna ports indicated for the SRS resource, a Codebooksubset field, a Maxrank field, and/or a TransformPrecoder field. The quantity of antenna ports may be used to identify a quantity of rows for an associated TPMI matrix. The Codebooksubset field may indicate whether the antenna ports are fully coherent, partially coherent, noncoherent, or a combination thereof in the case that some antenna ports are pair-wise coherent but not full coherent (e.g., Pair 1 of two antenna ports are coherent, Pair 2 of another two antenna ports are coherent, but Pair 1 and Pair 2 are noncoherent). For example, the Codebooksubset field may indicate that the antenna ports are fullyAndPartialAndNonCoherent, or partialAndNonCoherent, or noncoherent. In some cases, all TPMI indices that may be indicated by the BS may be used for fullyAndPartialAndNonCoherent antenna ports, a subset of the TPMI indices may be used for partialAndNonCoherent antenna ports, and another subset of the TPMI indices may be used for noncoherent antenna ports. The Maxrank field may indicate a maximum quantity of layers for the PUSCH transmission. The Maxrank field may be used only if the TransformPrecoder field is not enabled. The TransformPrecoder field may indicate whether DFT-s-OFDM or CP-OFDM is enabled based at least in part on whether the TransformPrecoder field is enabled.

In some cases, a BS may configure a UE to transmit a plurality of repetitions of the same PUSCH transmission (e.g., a plurality of repetitions of the same PUSCH transport block), where each repetition may be directed to a TRP among a plurality of TRPs in a multi-TRP configuration, an antenna panel among a plurality of antenna panels in a multi-panel configuration, or an antenna among a plurality of antennas in a multi-antenna configuration. Thus, if an access link between the UE and a TRP (or antenna panel or antenna) is blocked such that a repetition transmitted to the TRP is not received, another repetition transmitted to another TRP may be received such that the PUSCH transmission can be decoded.

In some cases, the UE may be configured to transmit repetitions of a PUSCH transmission in different time-domain resources (e.g., slots/mini-slots). Each time-domain resource configured for a repetition of the PUSCH transmission may be referred to as a PUSCH transmission occasion. In some cases, the quantity of the repetitions (and thus, the quantity of PUSCH transmission occasions) may be configured via radio resource control (RRC) signaling or may be indicated dynamically (e.g., via DCI or medium access control control element (MAC-CE) signaling) through the use of a time domain resource assignment (TDRA) field. However, the BS may be capable of configuring only one TPMI that is to be used across all repetitions of the PUSCH transmission. If the same TPMI (and thus, the same precoder) is used for repetitions that are directed to different TRPs, antenna panels, or antennas, the transmissions of repetitions may experience reduced performance and/or reliability because channel conditions for the TRPs, antenna panels, or antennas, may be different and not optimally addressed by the same precoder.

Some aspects described herein provide techniques and apparatuses for TPMI and/or SRI indication for codebook-based PUSCH repetition. In some aspects, a UE may receive, from a BS, a downlink communication that includes one or more codepoints indicating a plurality of TPMI indices and/or an SRI codepoint indicating one or more SRS resources. The UE may identify, based at least in part on the one or more codepoints, one or more TPMI indices, of the plurality of TPMI indices, for one or more repetitions of a codebook-based PUSCH transmission and/or may identify, based at least in part on the SRI codepoint, one or more SRS resources for the one or more repetitions.

The ability to indicate a plurality of TPMI indices and/or a plurality of SRS resources in a single downlink communication permits the BS to configure a plurality of repetitions of a codebook-based PUSCH transmission to have different precoders, different SRS resources, and/or other parameters while reducing or minimizing signaling overhead. The ability to configure repetitions of a codebook-based PUSCH transmission to have different precoders, different SRS resources, and/or other parameters permits the repetitions to be beamformed and/or otherwise optimized for different channel conditions (e.g., multi-TRP channel conditions, multi-panel channel conditions, multi-antenna channel conditions, and/or the like), which increases the performance and reliability of the PUSCH transmissions.

FIGS. 3A-3G are diagrams illustrating one or more examples 300 of TPMI and/or SRI indication for codebook-based PUSCH repetition, in accordance with various aspects of the present disclosure. As shown in FIGS. 3A-3G, example(s) 300 may include communication between a UE (e.g., a UE 120) and a BS (e.g., a BS 110). In some aspects, the UE and the BS may be included in a wireless network, such as wireless network 100. In some aspects, the UE and the BS may communicate on a wireless access link, which may include a downlink and an uplink.

In some aspects, the BS may schedule or configure the UE to transmit one or more repetitions of a PUSCH transmission. For example, the BS may schedule or configure the UE to transmit a first repetition on the uplink to the BS (e.g., to an antenna or an antenna panel of the BS), a second repetition on the uplink (e.g., to another antenna or antenna panel of the BS) or on another uplink to another BS (e.g., where the BS and the other BS are TRPs in a multi-TRP configuration), and so on. In some aspects, the PUSCH transmission may be a codebook-based PUSCH transmission (e.g., where an SRS resource set is configured for the PUSCH transmission with usage of 'codebook').

Figure 3A:
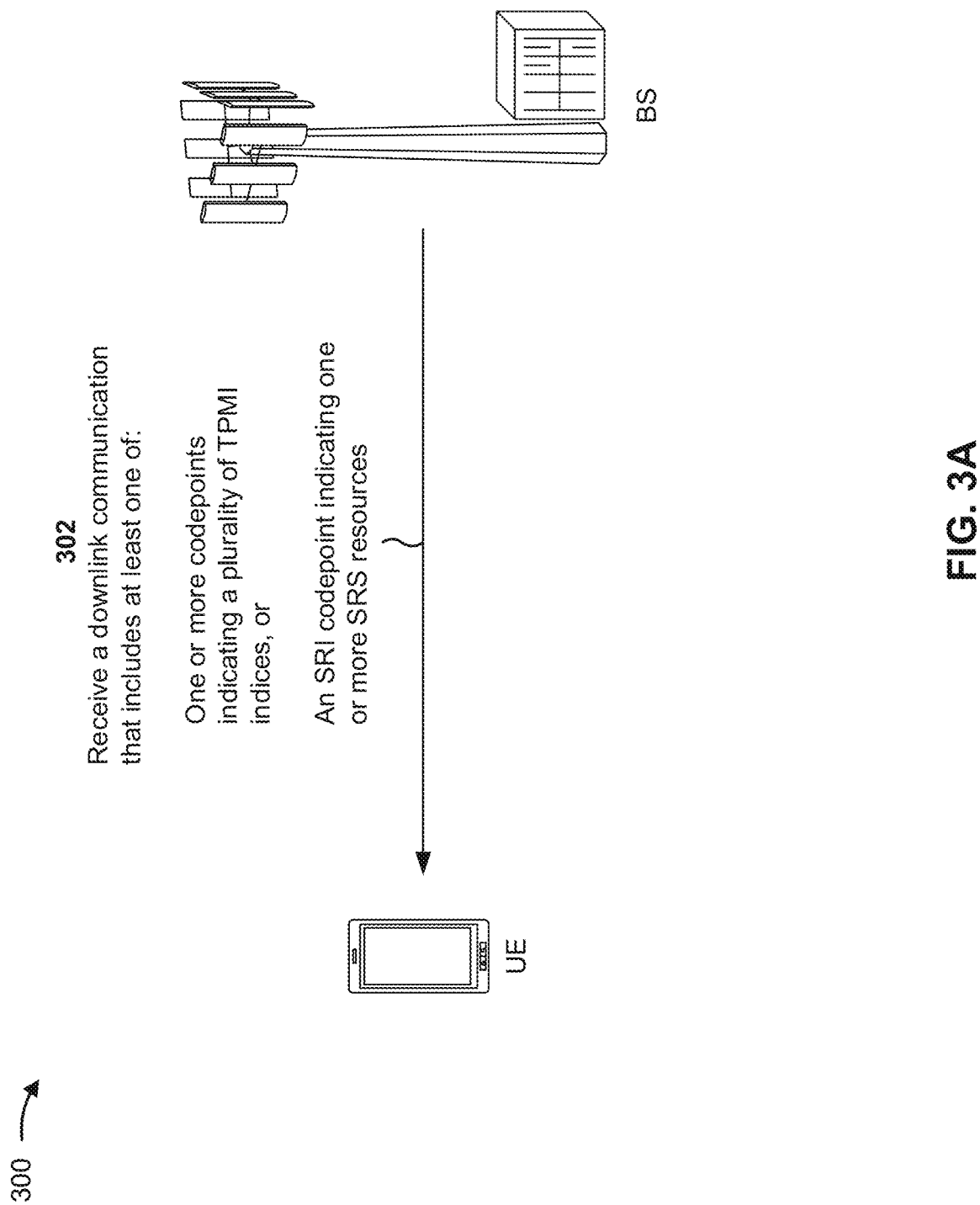

As shown in FIG. 3A, and by reference number 302, to schedule or configure the one or more repetitions of the PUSCH transmission, the BS may transmit a downlink communication to the UE. The downlink communication may include one or more codepoints indicating a plurality of TPMI indices for the PUSCH transmission and/or may include an SRI codepoint indicating one or more SRS resources for the PUSCH transmission.

In some aspects, the BS may schedule or configure PUSCH transmissions for the UE using a configured uplink grant. In this case, the BS may transmit an RRC communication that configures recurring or periodic resources that the UE may use for the PUSCH transmissions (which may be referred to as Type 1 configured grant PUSCH (CG-PUSCH) scheduling), or may transmit an RRC communication that configures the CG-PUSCH and activates the CG-PUSCH via a DCI communication (which may be referred to as Type 2 CG-PUSCH). If the downlink communication is a Type 1 CG-PUSCH RRC communication, the one or more codepoints may be included in a precodingAndNumberOfLayers field in the RRC communication, and the SRI codepoint may be included in an srs-Resourceindicator field in the RRC communication.

In some aspects, the BS may schedule or configure PUSCH transmissions for the UE using dynamic scheduling. In this case, the BS may transmit DCI communications (e.g., format 0_1 DCI communications) to the UE to schedule or configure resources for PUSCH transmissions. If the downlink communication is a DCI communication, the one or more codepoints may be included in a Precoding Information and Number of Layers field or another field that is used to indicate TPMI indices and a quantity of layers for the PUSCH transmission, and/or the SRI codepoint may be included in an SRI field.

In some aspects, the precodingAndNumberOfLayers field in an RRC communication or a Precoding Information and Number of Layers field in a DCI communication may indicate one or more of the plurality of TPMI indices. For example, either of these fields may include a codepoint of the one or more codepoints, and the codepoint may point to or otherwise indicate a quantity of layers and one or more TPMI indices for the PUSCH transmission. In some aspects, an RRC communication may include a plurality of precodingAndNumberOfLayers fields, or a DCI communication may include a plurality of Precoding Information and Number of Layers fields. In this case, each precodingAndNumberOfLayers field or Precoding Information and Number of Layers field may indicate a single TPMI index such that the plurality of precodingAndNumberOfLayers fields or the Precoding Information and Number of Layers fields indicate a plurality of TPMI indices. In some aspects, if the BS is to configure a single TPMI index for a PUSCH transmission (e.g., such as where an SRI codepoint indicates one SRS resource or is not configured with 2-TPMI), the BS may set the codepoint in the precodingAndNumberOfLayers fields or the Precoding Information and Number of Layers fields after the first precodingAndNumberOfLayers field or the Precoding Information and Number of Layers field to a predetermined value, such as a 0-value.

The quantity of layers, the quantity of TPMI indices, and the TPMI indices indicated by a codepoint in a precodingAndNumberOfLayers field or a Precoding Information and Number of Layers field may be based at least in part on an interpretation of the value of the codepoint. FIG. 3B illustrates an example table for indicating a plurality of TPMI indices. Other example tables for indicating a plurality of TPMI indices may be used. As shown in FIG. 3B, a first column of the table may include an index value for each row in the table. The index value may correspond to an associated codepoint value indicated in a precodingAndNumberOfLayers field or a Precoding Information and Number of Layers field. The table may include a second column identifying a mapping associated with an index value in the same row. The mapping may indicate the quantity of layers, the quantity of TPMI indices, and the TPMI indices for an index value (codepoint value). As further shown in FIG. 3B, the mapping in each row may specify an order of the TPMI indices indicated in the row. In this case, each combination of TPMI indices may be included in the table a plurality of times such that different orders of the same combination of TPMI indices are included. As an example, and as illustrated in FIG. 3B, the example table may include an index value 1 associated with a TPMI index order of (TPMI 0, TPMI 1), and may include an index value 4 associated with the reverse TPMI index order of (TPMI 1, TPMI 0).

In some aspects, the BS may be permitted to indicate any of the index values included in the table. To reduce the quantity of bits included in the codepoint of the precodingAndNumberOfLayers field or the Precoding Information and Number of Layers field (and thus, the overhead of the codepoint), the BS may semi-statically configure (e.g., via RRC signaling) a subset of the table that the BS is permitted to use. In this case, the subset of the table may be configured as another (smaller) table into which the codepoint may index. In some aspects, to more flexibly utilize the table, the BS may be permitted to dynamically (e.g., via MAC-CE or DCI) configure and change the subset of the table that is used to indicate TPMI indices.

In some aspects, the quantity of SRS resources, and the SRS resources, indicated by an SRI codepoint in an srs-ResourceIndicator field in an RRC communication or an SRI field in a DCI communication may be based at least in part on an interpretation of the value of the SRI codepoint. FIG. 3C illustrates an example table for indicating one or more SRS resources. Other example tables for indicating one or more SRS resources may be used. As shown in FIG. 3C, a first column of the table may include an index value for each row in the table. The index value may correspond to an associated SRI codepoint value indicated in an srs-ResourceIndicator field or an SRI field. The table may include one or more columns identifying a mapping associated with an index value in the same row based at least in part on a quantity of SRS resources configured for a PUSCH transmission. For example, the table may include a row indicating a mapping for a quantity of 2 configured SRS resources, a row indicating a mapping for a quantity of 3 configured SRS resources, a row indicating a mapping for a quantity of 4 configured SRS resources, and so on. The mapping may indicate the SRS resource(s) and the order of the SRS resources for an index value (SRI codepoint value). In this case, each combination of SRS resources may be included in the table a plurality of times such that different orders of the same combination of SRS resources are included. As an example, and as illustrated in FIG. 3C, the example table may include an index value 2 associated with a TPMI index order of (SRS resource 0, SRS resource 1), and may include an index value 3 associated with the reverse order of (SRS resource 1, SRS resource 0).

In some aspects, if the srs-ResourceIndicator field or the SRI field indicates a plurality of SRS resources for a plurality of TPMI indices, the UE may use, for each SRS resource indicated by an SRI codepoint, the spatial relation information (spatialRelationInfo) of the SRS resource for the spatial domain transmission filter for a repetition of a PUSCH transmission associated with the SRS resource. Moreover, for each SRS resource indicated by an SRI codepoint, the UE may use the quantity of SRS ports associated with the SRS resource for the quantity of transmit antenna ports that is to be used for the PUSCH transmission. In this case, the UE may determine the TPMI matrix for a TPMI index for an associated repetition based at least in part on the quantity of SRS ports associated with the SRS resource.

In some aspects, if the srs-ResourceIndicator field or the SRI field indicates a single SRS resource for a plurality of TPMI indices, the UE may use, for the SRS resource and the plurality of TPMI indices, the same spatial relation information (spatialRelationInfo) for transmission of the repetition(s) associated with the plurality of TPMI indices. In some aspects, the BS may configure a single SRS resource for a plurality of TPMI indices in cases where relative low frequency bands are used, such as sub-6 GHz or 5G NR frequency range 1 (FR1), as separate uplink beams may not be needed for transmission of different repetitions of the PUSCH transmission to different TRPs, different antenna panels, or different antennas. In some aspects, the BS may transmit, to the UE, an indication of the SRS resources that are permitted to be used with a plurality of TPMI indices. In this case, the indication may be included in an RRC communication as part of an SRS resource configuration for SRS resources in an SRS resource set with usage set to 'codebook'. In some aspects, the ability to switch between indicating one TPMI index or a plurality of TPMI indexes with the same SRS resource, and the ability to switch between indicating one SRS resource and a plurality of SRS resources, may be configurable by the BS via RRC signaling.

Figure 3D:
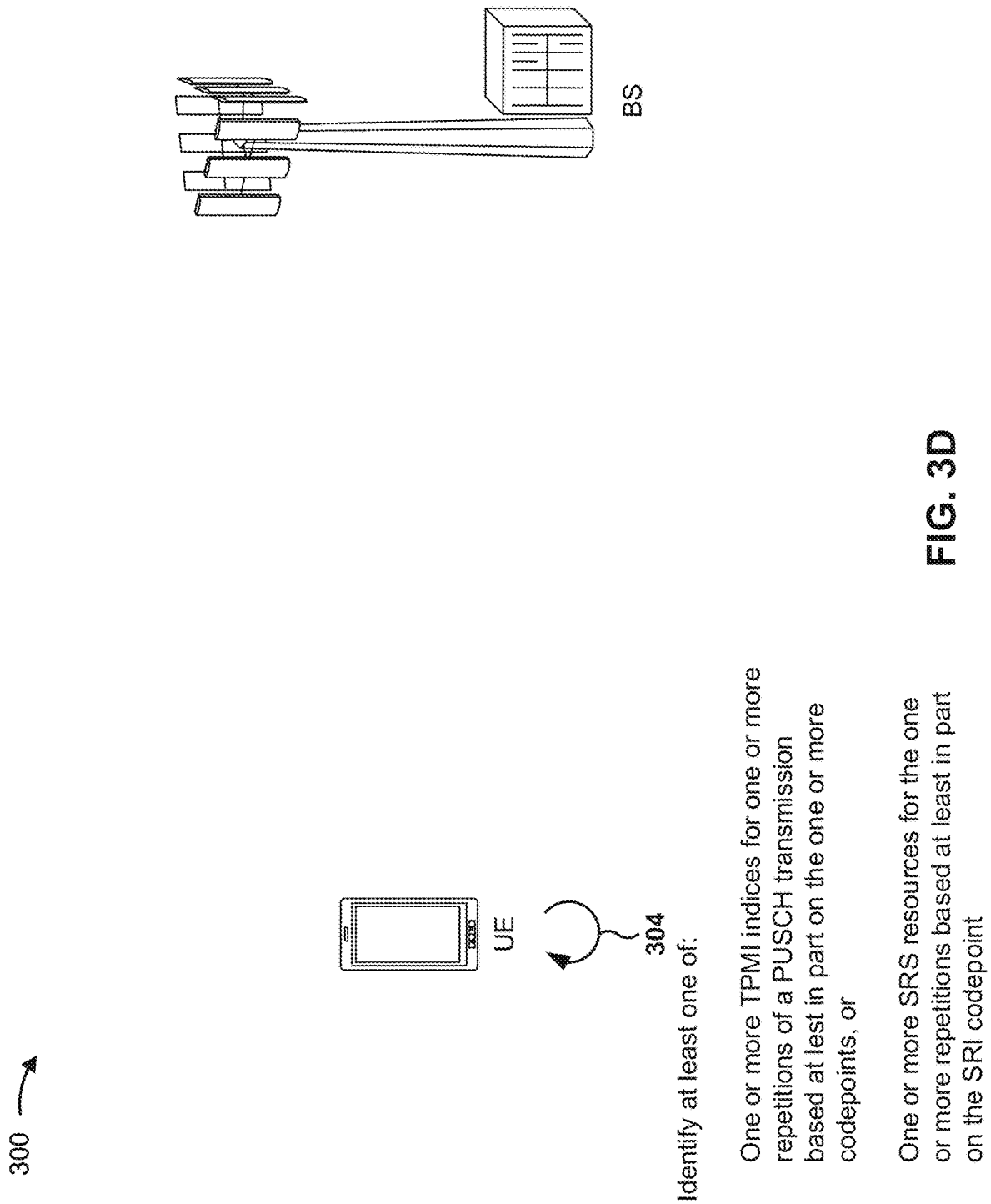

As shown in FIG. 3D, and by reference number 304, the UE may identify one or more TPMI indices for one or more repetitions of a PUSCH transmission (e.g., a codebook-based PUSCH transmission) based at least in part on the one or more codepoints included in the downlink communication, and/or may identify one or more SRS resources for the one or more repetitions based at least in part on the SRI codepoint indicated in the downlink communication.

In some aspects, the UE may identify the one or more TPMI indices by determining the value of a codepoint included in the one or more codepoints and by performing a lookup in a table (e.g., such as the example table illustrated in FIG. 3B) or another type of data structure to identify an index, associated with the value, in the table. In this case, the UE may identify a row in the table in which the UE performs the lookup to determine the quantity of layers, the quantity of TPMI indices, the TPMI indices, and the order of the TPMI indices indicated by the codepoint. In some aspects, the UE may identify the one or more TPMI indices by performing a lookup to identify the row in a subset of the table configured by the BS and indicated in an RRC communication or a MAC-CE communication.

In some aspects, if the downlink communication includes a plurality of codepoints (e.g., one codepoint in each precodingAndNumberOfLayers field or in each Precoding Information and Number of Layers field, the UE may determine the value for each codepoint and may perform a lookup in a table based at least in part on each value to identify a row specifying a TPMI index for each codepoint.

In some aspects, the UE may identify the table in which to perform the lookup based at least in part on the quantity of SRS resources indicated by the SRI codepoint, based at least in part on whether the srs-ResourceIndicator field or the SRI field in which the SRI codepoint is included is configured with a 2-TPMI configuration, and/or other factors. As an example, the UE may determine to use a first table (e.g., a table that is used to indicate a plurality of TPMI indices, such as the example table illustrated in FIG. 3B) to interpret the value of the codepoint if the SRI codepoint indicates two or more SRS resources, and may determine to use a second table (e.g., a table that is used to indicate a single TPMI index) to interpret the value of the codepoint if the SRI codepoint indicates a single SRS resource. As another example, the UE may determine to use a table (e.g., a table that is used to indicate a plurality of TPMI indices, such as the example table illustrated in FIG. 3B) to interpret the value of the codepoint if the SRI codepoint indicates two or more SRS resources, and may determine to use the same table to interpret the value of the codepoint if the SRI codepoint indicates a single SRS resource. In this case, the UE may use the first TPMI index indicated in the row associated with the value of the codepoint if the SRI codepoint indicates a single SRS resource.

As another example, the UE may determine to use a first table (e.g., a table that is used to indicate a plurality of TPMI indices, such as the example table illustrated in FIG. 3B) to interpret the value of the codepoint if the SRI codepoint indicates a single SRS resource and is configured with 2-TPMI (e.g., such that the SRS resource corresponds to a plurality of TPMI indices indicated by the downlink communication), and may determine to use a second table (e.g., a table that is used to indicate a single TPMI index) to interpret the value of the codepoint if the SRI codepoint indicates a single SRS resource and is not configured with 2-TPMI (e.g., such that SRS resource corresponds to a single TPMI index indicated by the downlink communication). As another example, the UE may determine to use a table (e.g., a table that is used to indicate a plurality of TPMI indices, such as the example table illustrated in FIG. 3B) to interpret the value of the codepoint if the SRI codepoint indicates two or more SRS resources, and may determine to use the same table to interpret the value of the codepoint if the SRI codepoint indicates a single SRS resource. In this case, the UE may use the first TPMI index indicated in the row associated with the value of the codepoint if the SRI codepoint indicates a single SRS resource.

In some aspects, the UE may identify the one or more SRS resources by determining the value of the SRI codepoint and by performing a lookup in a table (e.g., such as the example table illustrated in FIG. 3C) or another type of data structure to identify an index, associated with the value, in the table. In this case, the table in which the UE performs the lookup may indicate the SRS resource(s) and the order of the SRS resource(s). In some aspects, the UE may identify the one or more SRS resources by performing a lookup to identify the row in a subset of the table configured by the BS and indicated in an RRC communication or a MAC-CE communication.

In some aspects, the UE may map the TPMI indices and/or the SRS resource(s) to the one or more repetitions of the PUSCH transmission. For example, the UE may map a first TPMI index and/or a first SRS resource to a first repetition of the PUSCH transmission, may map a second TPMI index and/or a second SRS resource to a second repetition of the PUSCH transmission, and so on. The UE may map the TPMI indices to the repetition(s) of the PUSCH transmission based at least in part on the order of the TPMI indices associated with the value of the codepoint (e.g., as indicated in the table in which the UE performed the lookup). For example, the UE may map the first ordered TPMI index to the first repetition and may map the second ordered TPMI index to the second repetition.

Similarly, the UE may map the SRS resource(s) to the repetition(s) of the PUSCH transmission based at least in part on the order of the SRS resource(s) associated with the value of the SRI codepoint (e.g., as indicated in the table in which the UE performed the lookup). For example, the UE may map the first ordered SRS resource to the first repetition and may map the second ordered SRS resource to the second repetition. In some aspects, if a single SRS resource is indicated by the SRI codepoint, the UE may map the SRS resource to each of the repetitions scheduled by the downlink communication.

Moreover, the UE may determine whether an SRS resource indicated by the SRI codepoint maps to one or two TPMI indices based at least in part on whether an srs-ResourceIndicator field or an SRI field in which the SRI codepoint is included is configured with 2-TPMI. In this case, the UE may determine that an SRS resource maps to two TPMIs based at least in part on determining that the srs-ResourceIndicator field or the SRI field is configured with 2-TPMI. The UE may determine that an SRS resource maps to one TPMI based at least in part on determining that the srs-ResourceIndicator field or the SRI field is not configured with 2-TPMI.

Figure 3E:
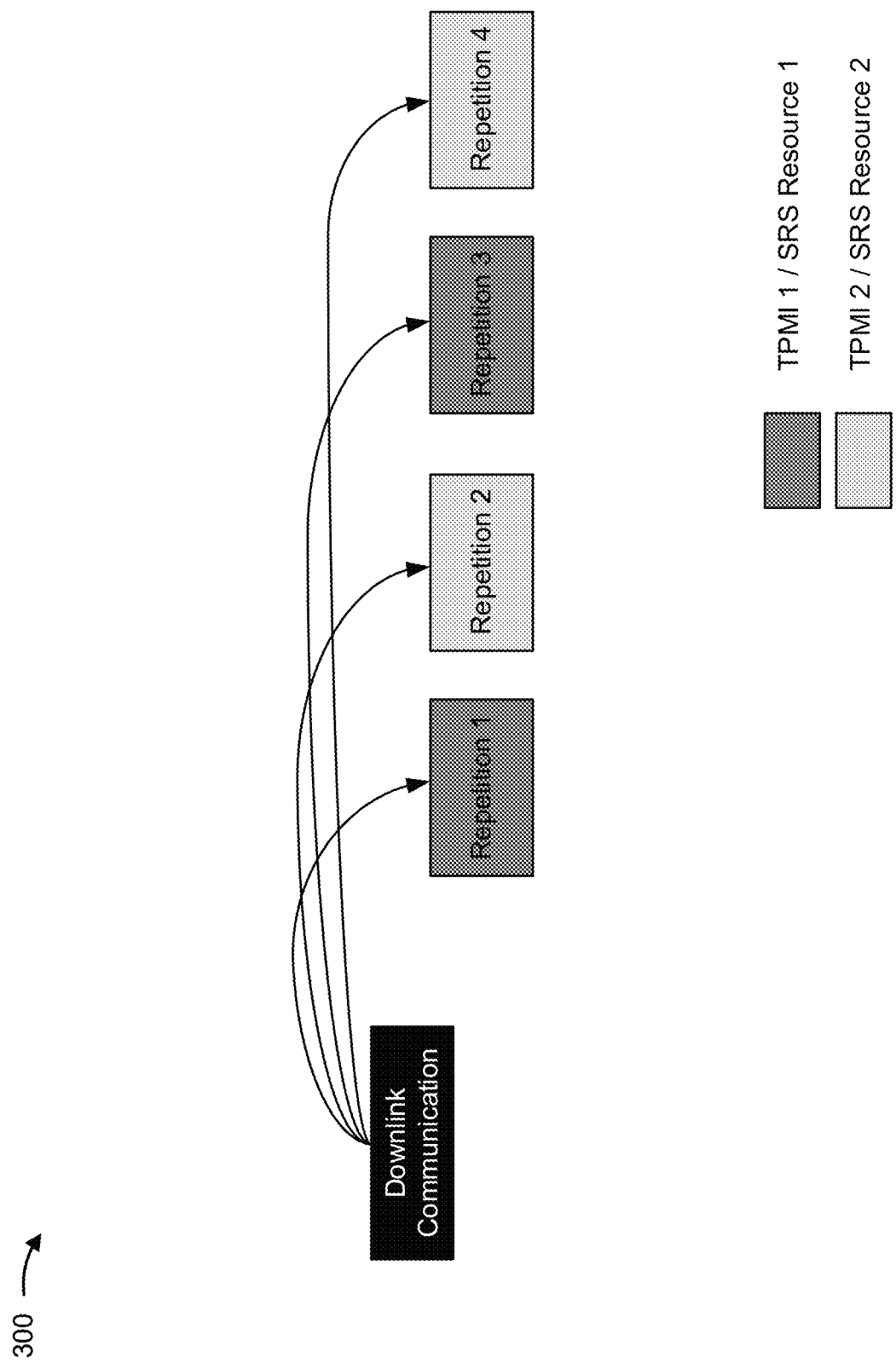
Figure 3F:
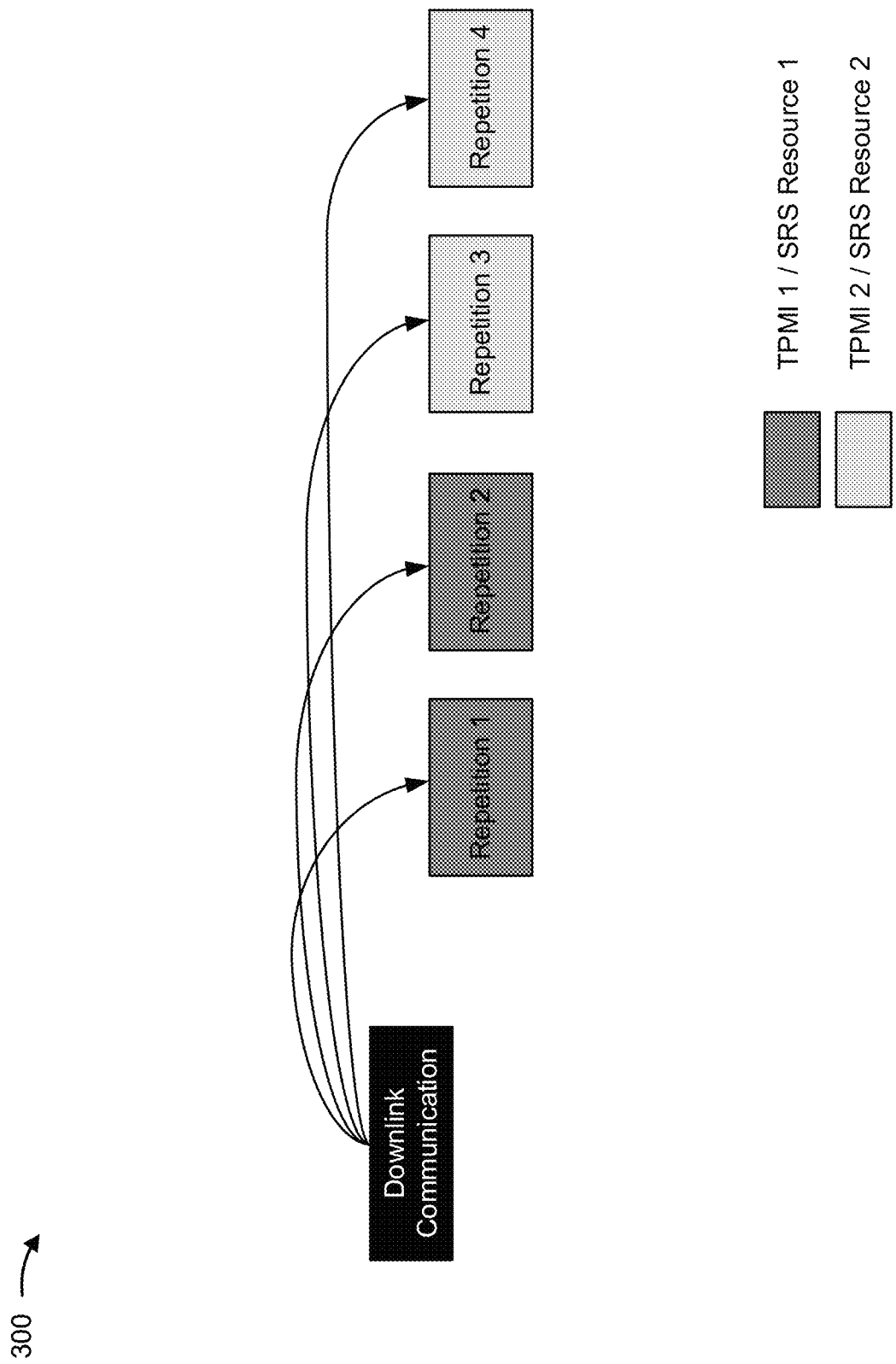

In some aspects, the UE may use various techniques to map TPMI indices and/or SRS resources to repetitions of a PUSCH transmission where the quantity of repetitions exceeds the quantity of TPMI indices and/or the quantity of SRS resources. FIGS. 3E and 3F illustrate some example techniques. However, other techniques may be used. The mapping of TPMI indices and/or SRS resources to repetitions of a PUSCH transmission where the quantity of repetitions exceeds the quantity of TPMI indices and/or the quantity of SRS resources may be fixed (e.g., in a specification or configured or coded at the UE), may be semi-statically configurable via RRC signaling, may be dynamically configurable via MAC-CE or DCI signaling, and/or the like.

As shown in FIG. 3E, an example mapping for TPMI indices and/or SRS resources may include an alternating mapping of TPMI indices and/or SRS resources to repetitions of a PUSCH transmission. In this example, the UE may alternate between TPMI 1/SRS resource 1 and TPMI 2/SRS resource 2 for repetitions 1 through 4. In particular, the UE may map TPMI 1/SRS resource 1 to repetition 1, may map TPMI 2/SRS resource 2 to repetition 2, may map TPMI 1/SRS resource 1 to repetition 3, and may map TPMI 2/SRS resource 2 to repetition 4. Thus, TPMI 1/SRS resource 1 are mapped to odd-numbered repetitions and TPMI 2/SRS resource 2 are mapped to even-numbered repetitions. In other examples, TPMI 2/SRS resource 2 are mapped to odd-numbered repetitions and TPMI 1/SRS resource 1 are mapped to even-numbered repetitions.

As shown in FIG. 3F, an example mapping for TPMI indices and/or SRS resources may include a grouped mapping of TPMI indices and/or SRS resources to repetitions of a PUSCH transmission. In this example, the UE may map TPMI 1/SRS resource 1 to a first group of repetitions (e.g., repetitions 1 and 2) and may map TPMI 2/SRS resource 2 to a second (subsequent) group of repetitions (e.g., repetitions 3 and 4). In other examples, TPMI 2/SRS resource 2 are mapped to the first group of repetitions and TPMI 1/SRS resource 1 are mapped to the second group of repetitions.

Figure 3G:
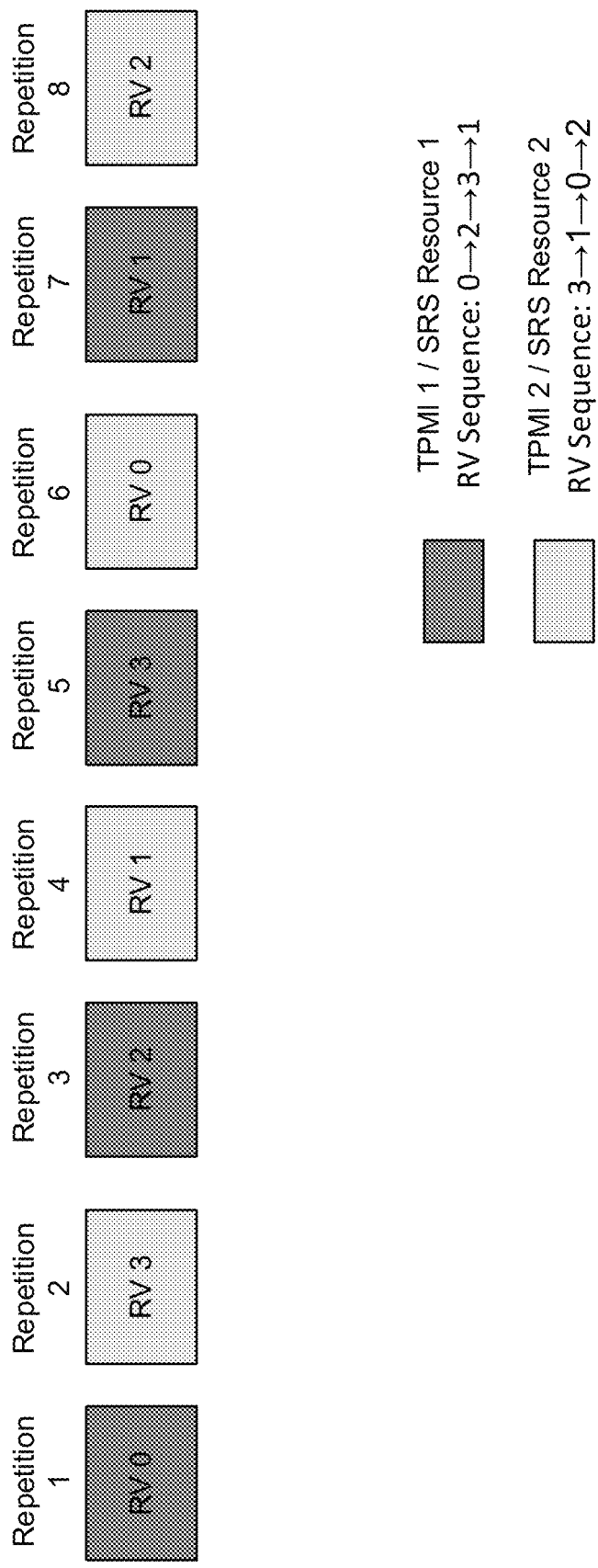

As shown in FIG. 3G, the UE may determine a redundancy version (RV) for each repetition of a PUSCH transmission. The RV for a repetition may be used to rate match the payload of the PUSCH transmission in the repetition. In some aspects, the UE may determine the RV for a repetition based at least in part on the TPMI index and/or SRS resource mapped to the repetition. In this case, each TPMI index and/or SRS resource may be associated with an RV sequence, and the RV for a repetition may be based at least in part on the RV sequence of the TPMI index and/or SRS resource mapped to the repetition. As an example, and as illustrated in FIG. 3G, a first TPMI and a first SRS resource (e.g., TPMI 1/SRS resource 1) may be associated with a first RV sequence (e.g., 0→2→3→1), and a second TPMI and a second SRS resource (e.g., TPMI 2/SRS resource 2) may be associated with a second RV sequence (e.g., 3→1→0→2).

In this case, the second RV sequence is essentially the same RV sequence as the first RV sequence, but configured with an RV offset value such that the starting point of the second RV sequence is shifted relative to the first RV sequence. Since the RV offset value causes the second RV sequence to be shifted relative to the first RV sequence, the likelihood that adjacent repetitions will be transmitted with the same RV is reduced or eliminated. In some aspects, the first RV sequence and the second RV sequence may be different RV sequences configured such that the likelihood that adjacent repetitions will be transmitted with the same RV is reduced or eliminated.

For example, and as illustrated in FIG. 3, TPMI 1/SRS resource 1 and TPMI 2/SRS resource 2 may be mapped to repetitions 1 through 8 of a PUSCH transmission in an alternating manner such that TPMI 1/SRS resource 1 are mapped to odd-numbered repetitions and TPMI 2/SRS resource 2 are mapped to even-numbered repetitions. RVs may be mapped to the odd-numbered repetitions based at least in part on the first RV sequence associated with TPMI 1/SRS resource 1, and RVs may be mapped to the even-numbered repetitions based at least in part on the second RV sequence associated with TPMI 2/SRS resource 2. Accordingly, the RV mappings may be RV 0 for repetition 1, RV 3 for repetition 2, RV 2 for repetition 3, RV 1 for repetition 4, RV 3 for repetition 5, RV 0 for repetition 6, RV 1 for repetition 7, and RV 2 for repetition 8. Thus, no adjacent repetitions are assigned the same RV as a result of the RV offset value.

In some aspects, the UE may configure redundancy versions for repetitions of PUSCH transmission. The PUSCH transmission may be codebook-based or non-codebook-based. In these examples, the UE may receive a downlink communication from the BS that schedules a first set of repetitions of a PUSCH transmission associated with a first uplink beam (e.g., the first set of repetitions are associated with the same spatial domain transmission filter, as described above) and a second set of repetitions of the PUSCH transmission associated with a second uplink beam (e.g., the second set of repetitions are associated with the same spatial domain transmission filter, as described above, which may be different from the spatial domain transmission filter of the first set of repetitions). The UE may configure respective redundancy versions for the first set of repetitions based at least in part on a first redundancy version sequence associated with the first uplink beam, and may configure respective redundancy versions for the second set of repetitions based at least in part on a second redundancy version sequence associated with the second uplink beam.

In this way, the ability to indicate a plurality of TPMI indices and/or a plurality of SRS resources in a single downlink communication permits the B S to configure a plurality of repetitions of a codebook-based PUSCH transmission to have different precoders, different SRS resources, and/or other parameters while reducing or minimizing signaling overhead. The ability to configure repetitions of a codebook-based PUSCH transmission to have different precoders, different SRS resources, and/or other parameters permits the repetitions to be beamformed and/or otherwise optimized for different channel conditions (e.g., multi-TRP channel conditions, multi-panel channel conditions, multi-antenna channel conditions, and/or the like), which increases the performance and reliability of the PUSCH transmissions.

As indicated above, FIGS. 3A-3G are provided as one or more examples. Other examples may differ from what is described with respect to FIGS. 3A-3G.

Figure 4:
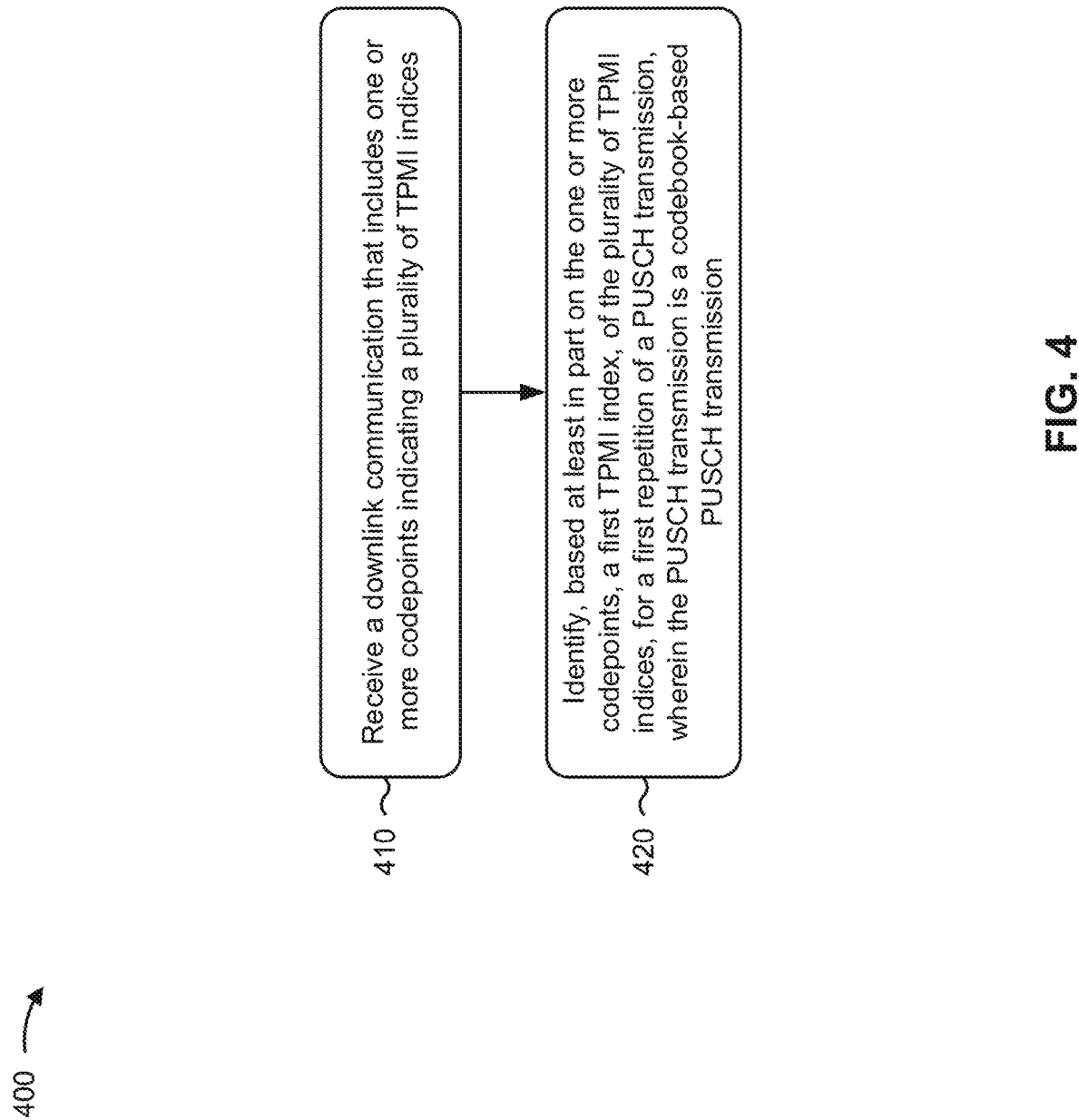
FIGS. 4 and 5 are diagrams illustrating example processes performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., a UE 120) performs operations associated with TPMI and/or SRI indication for codebook-based PUSCH repetition.

As shown in FIG. 4, in some aspects, process 400 may include receiving a downlink communication that includes one or more codepoints indicating a plurality of TPMI indices (block 410). For example, the UE (e.g., using antenna 252, DEMOD 254, MIMO detector 256, receive processor 258, controller/processor 280, memory 282, and/ or the like) may receive a downlink communication that includes one or more codepoints indicating a plurality of TPMI indices, as described above.

As further shown in FIG. 4, in some aspects, process 400 may include identifying, based at least in part on the one or more codepoints, a first TPMI index, of the plurality of TPMI indices, for a first repetition of a PUSCH transmission, wherein the PUSCH transmission is a codebook-based PUSCH transmission (block 420). For example, the UE (e.g., using receive processor 258, transmit processor 264, controller/processor 280, memory 282, and/or the like) may identify, based at least in part on the one or more codepoints, a first TPMI index, of the plurality of TPMI indices, for a first repetition of a PUSCH transmission, as described above. In some aspects, the PUSCH transmission is a codebook-based PUSCH transmission.

Process 400 may include additional aspects, such as any single aspect or any combination of aspects described below and/or in connection with one or more other processes described elsewhere herein.

In a first aspect, the one or more codepoints includes a single codepoint, in a Precoding Information and Number of Layers field of the downlink communication, indicating the plurality of TPMI indices; and process 400 further comprises identifying, based at least in part on the one or more codepoints, a second TPMI index, of the plurality of TPMI indices, for a second repetition of the PUSCH transmission.

In a second aspect, alone or in combination with the first aspect, the codepoint indicates a same quantity of layers for the first repetition of the PUSCH transmission and the second repetition of the PUSCH transmission.

In a third aspect, alone or in combination with one or more of the first and second aspects, order of the first TPMI index and the second TPMI index is indicated by a row in a table associated with a value indicated by the codepoint. In a fourth aspect, alone or in combination with one or more of the first through third aspects, a reverse order of the first TPMI index and the second TPMI index is indicated by another row in the table associated with another codepoint value. In a fifth aspect, alone or in combination with one or more of the first through fourth aspects, identifying the first TPMI index and the second TPMI index comprises identifying, based at least in part on a value indicated by the codepoint, a row in a table specifying the first TPMI index and the second TPMI index.

In a sixth aspect, alone or in combination with one or more of the first through fifth aspects, identifying the first TPMI index and the second TPMI index comprises identifying the row from a subset of rows of the table indicated in a radio resource control communication or a medium access control element communication. In a seventh aspect, alone or in combination with one or more of the first through sixth aspects, the one or more codepoints include a first codepoint, in a first Precoding Information and Number of Layers field of the downlink communication, indicating the first TPMI index and a second codepoint, in a second Precoding Information and Number of Layers field of the downlink communication, indicating a second TPMI index of the plurality of TPMI indices.

In an eighth aspect, alone or in combination with one or more of the first through seventh aspects, the downlink communication includes an SRI codepoint that indicates one or more SRS resources, having a usage set to codebook, for the PUSCH transmission. In a ninth aspect, alone or in combination with one or more of the first through eighth aspects, indicates a plurality of SRS resources; and process 400 further comprises identifying, based at least in part on the one or more codepoints, a second TPMI index, of the plurality of TPMI indices, for a second repetition of the PUSCH transmission; and identifying, based at least in part on the SRI codepoint, a first SRS resource of, the plurality of SRS resources, for the first repetition of the PUSCH transmission and a second SRS resource, of the plurality of SRS resources, for a second repetition of the PUSCH transmission.

In a tenth aspect, alone or in combination with one or more of the first through ninth aspects, an order of the first SRS resource and the second SRS resource is indicated by a row in a table associated with a value indicated by the SRI codepoint. In an eleventh aspect, alone or in combination with one or more of the first through tenth aspects, a reverse order of the first SRS resource and the second SRS resource is indicated by another row in the table associated with another SRI codepoint value.

In a twelfth aspect, alone or in combination with one or more of the first through eleventh aspects, identifying the first SRS resource and the second SRS resource comprises identifying, based at least in part on a value indicated by the SRI codepoint, a row in a table specifying the first SRS resource and the second SRS resource.

In a thirteenth aspect, alone or in combination with one or more of the first through twelfth aspects, process 400 further comprises identifying spatial relation information, associated with the first SRS resource, as a spatial domain transmission filter to be used for the first repetition of the PUSCH transmission; and identifying spatial relation information, associated with the second SRS resource, as a spatial domain transmission filter to be used for the second repetition of the PUSCH transmission. In a fourteenth aspect, alone or in combination with one or more of the first through thirteenth aspects, process 400 further comprises identifying a quantity of SRS ports, associated with the first SRS resource, as a quantity of transmit antenna ports for the first repetition of the PUSCH transmission, wherein the first TPMI index is interpreted based at least in part on the first SRS resource; and identifying a quantity of SRS ports, associated with the second SRS resource, as a quantity of transmit antenna ports for the second repetition of the PUSCH transmission, wherein the second TPMI index is interpreted based at least in part on the second SRS resource.

In a fifteenth aspect, alone or in combination with one or more of the first through fourteenth aspects, the SRI codepoint indicates a single SRS resource; and process 400 further comprises identifying, based at least in part on the SRI codepoint, the SRS resource for the first repetition of the PUSCH transmission and a second repetition of the PUSCH transmission. In a sixteenth aspect, alone or in combination with one or more of the first through fifteenth aspects, identifying the first TPMI index comprises identifying, based at least in part on a value indicated by a codepoint of the one or more codepoints, a row in a first table specifying the first TPMI index, or identifying, based at least in part on a value indicated by the codepoint, a row in a first table specifying the plurality of TPMI indices, wherein the first TPMI index is listed first among the plurality of TPMI indices in the row.

In a seventeenth aspect, alone or in combination with one or more of the first through sixteenth aspects, identifying, based at least in part on the one or more codepoints, a second TPMI index, of the plurality of TPMI indices, for a second repetition of the PUSCH transmission; and identifying, based at least in part on the SRI codepoint, an SRS resource of the one or more SRS resources for the first repetition of the PUSCH transmission and for the second repetition of the PUSCH transmission. In an eighteenth aspect, alone or in combination with one or more of the first through seventeenth aspects, process 400 further comprises identifying spatial relation information, associated with the SRS resource, as a spatial domain transmission filter to be used for the first repetition of the PUSCH transmission and for the second repetition of the PUSCH transmission.

In a nineteenth aspect, alone or in combination with one or more of the first through eighteenth aspects, the SRS resource is identified, in a radio resource control communication, among a plurality of candidate SRS resources that are permitted to be associated with multiple TPMI indices. In a twentieth aspect, alone or in combination with one or more of the first through nineteenth aspects, the SRS resource is associated with the first TPMI index and the second TPMI index; and identifying the first TPMI index and the second TPMI index comprises identifying, based at least in part on a value indicated by the one or more codepoints, a row in a table specifying the first TPMI index and the second TPMI index.

In a twenty-first aspect, alone or in combination with one or more of the first through twentieth aspects, the SRI codepoint indicates a single SRS resource; and process 400 further comprises identifying, based at least in part on the SRI codepoint, the SRS resource for the first repetition of the PUSCH transmission and a second repetition of the PUSCH transmission. In a twenty-second aspect, alone or in combination with one or more of the first through twenty-first aspects, identifying the first TPMI index comprises identifying, based at least in part on a value indicated by a codepoint of the one or more codepoints, a row in a first table specifying the first TPMI index, or identifying, based at least in part on a value indicated by the codepoint, a row in a first table specifying the plurality of TPMI indices, wherein the first TPMI index is listed first among the plurality of TPMI indices in the row.

In a twenty-third aspect, alone or in combination with one or more of the first through twenty-second aspects, the SRI codepoint is configurable by radio resource control signaling to indicate one SRS resource or a plurality of SRS resources based at least in part on a UE capability of the UE. In a twenty-fourth aspect, alone or in combination with one or more of the first through twenty-third aspects, process 400 further comprises identifying, based at least in part on the SRI codepoint, a first SRS resource of, the plurality of SRS resources, for the first repetition of the PUSCH transmission; identifying, for a second repetition of the PUSCH transmission a second TPMI index of the plurality of TPMI indices based at least in part on the one or more codepoints and a second SRS resource of the plurality of SRS resources based at least in part on the SRI codepoint; and identifying, for a third repetition of the PUSCH transmission, the first TPMI index and the first SRS resource.

In a twenty-fifth aspect, alone or in combination with one or more of the first through twenty-fourth aspects, a mapping of the first TPMI index and the first SRS resource to the first repetition and to the third repetition, and a mapping of the second TPMI index and the second SRS resource to the second repetition, are based at least in part on a fixed alternating mapping for the first TPMI index, the first SRS resource, the second TPMI index, and the second SRS resource. In a twenty-sixth aspect, alone or in combination with one or more of the first through twenty-fifth aspects, a mapping of the first TPMI index and the first SRS resource to the first repetition and to the third repetition, and a mapping of the second TPMI index and the second SRS resource to the second repetition, are based at least in part on a mapping for the first TPMI index, the first SRS resource, the second TPMI index, and the second SRS resource indicated in a radio resource control communication or a downlink control information communication.

In a twenty-seventh aspect, alone or in combination with one or more of the first through twenty-sixth aspects, process 400 further comprises configuring respective redundancy versions for the first repetition of the PUSCH transmission and for the third repetition of the PUSCH transmission based at least in part on a redundancy version sequence; and configuring a redundancy version for the second repetition of the PUSCH transmission based at least in part on an offset value applied to the redundancy version sequence. In a twenty-eighth aspect, alone or in combination with one or more of the first through twenty-seventh aspects, the downlink communication is a DCI communication; the one or more codepoints are indicated in a Precoding Information and Number of Layers field in the DCI communication; and the SRI codepoint is indicated in an SRI field in the DCI communication.

In a twenty-ninth aspect, alone or in combination with one or more of the first through twenty-eighth aspects, the PUSCH transmission is configured by an uplink configured grant configuration; the downlink communication is an RRC communication configuring the uplink configured grant configuration; the one or more codepoints are indicated in a preocdingAndNumberOfLayers field in the RRC communication; and the SRI codepoint is indicated in an srs-ResourceIndicator field in the RRC communication. In a thirtieth aspect, alone or in combination with one or more of the first through twenty-ninth aspects, the PUSCH transmission is configured by an uplink configured grant configuration via a radio resource control communication; the downlink communication is a DCI communication that activates the uplink configured grant configuration; the one or more codepoints are indicated in a Precoding Information and Number of Layers field in the DCI communication; and the SRI codepoint is indicated in an SRI field in the DCI communication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
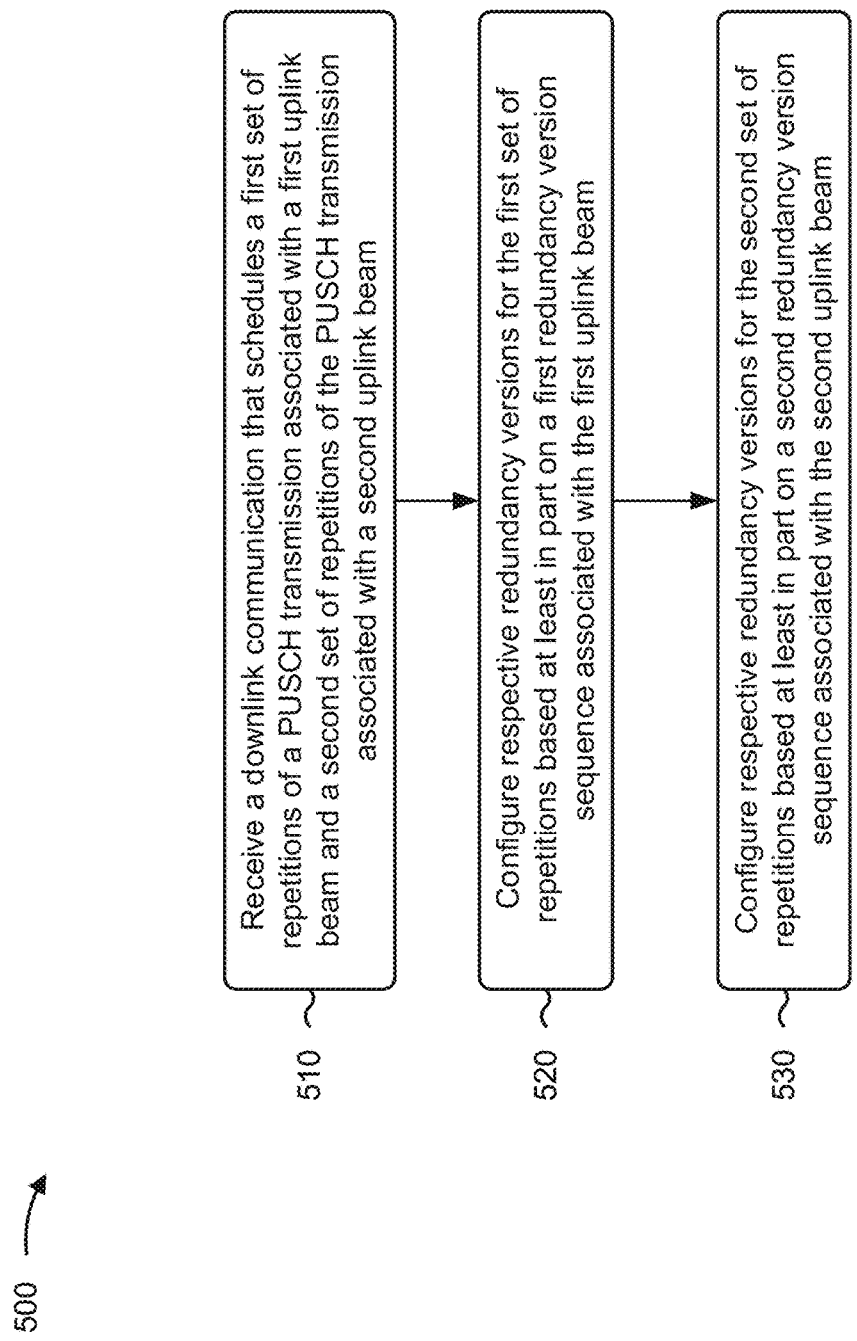

FIG. 5 is a diagram illustrating an example process 500 performed, for example, by a user equipment (UE), in accordance with various aspects of the present disclosure. Example process 500 is an example where the UE (e.g., UE 120) performs operations associated with TPMI and/or SRI indication for codebook-based PUSCH repetition.

As shown in FIG. 5, in some aspects, process 500 may include receiving a downlink communication that schedules a first set of repetitions of a PUSCH transmission associated with a first uplink beam and a second set of repetitions of the PUSCH transmission associated with a second uplink beam (block 510). For example, the UE (e.g., using reception component 702, depicted in FIG. 7) may receive a downlink communication that schedules a first set of repetitions of a PUSCH transmission associated with a first uplink beam and a second set of repetitions of the PUSCH transmission associated with a second uplink beam, as described above.

As further shown in FIG. 5, in some aspects, process 500 may include configuring respective redundancy versions for the first set of repetitions based at least in part on a first redundancy version sequence associated with the first uplink beam (block 520). For example, the UE (e.g., using configuration component 708, depicted in FIG. 7) may configure respective redundancy versions for the first set of repetitions based at least in part on a first redundancy version sequence associated with the first uplink beam, as described above.

As further shown in FIG. 5, in some aspects, process 500 may include configuring respective redundancy versions for the second set of repetitions based at least in part on a second redundancy version sequence associated with the second uplink beam (block 530). For example, the UE (e.g., using the configuration component 708, depicted in FIG. 7) may configure respective redundancy versions for the second set of repetitions based at least in part on a second redundancy version sequence associated with the second uplink beam, as described above.

Process 500 may include additional aspects, such as any single aspect or any combination of aspects described below and/or in connection with one or more other processes described elsewhere herein.

In a first aspect, the second redundancy sequence comprises the first redundancy sequence having a starting point that is shifted based at least in part on a redundancy version offset.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
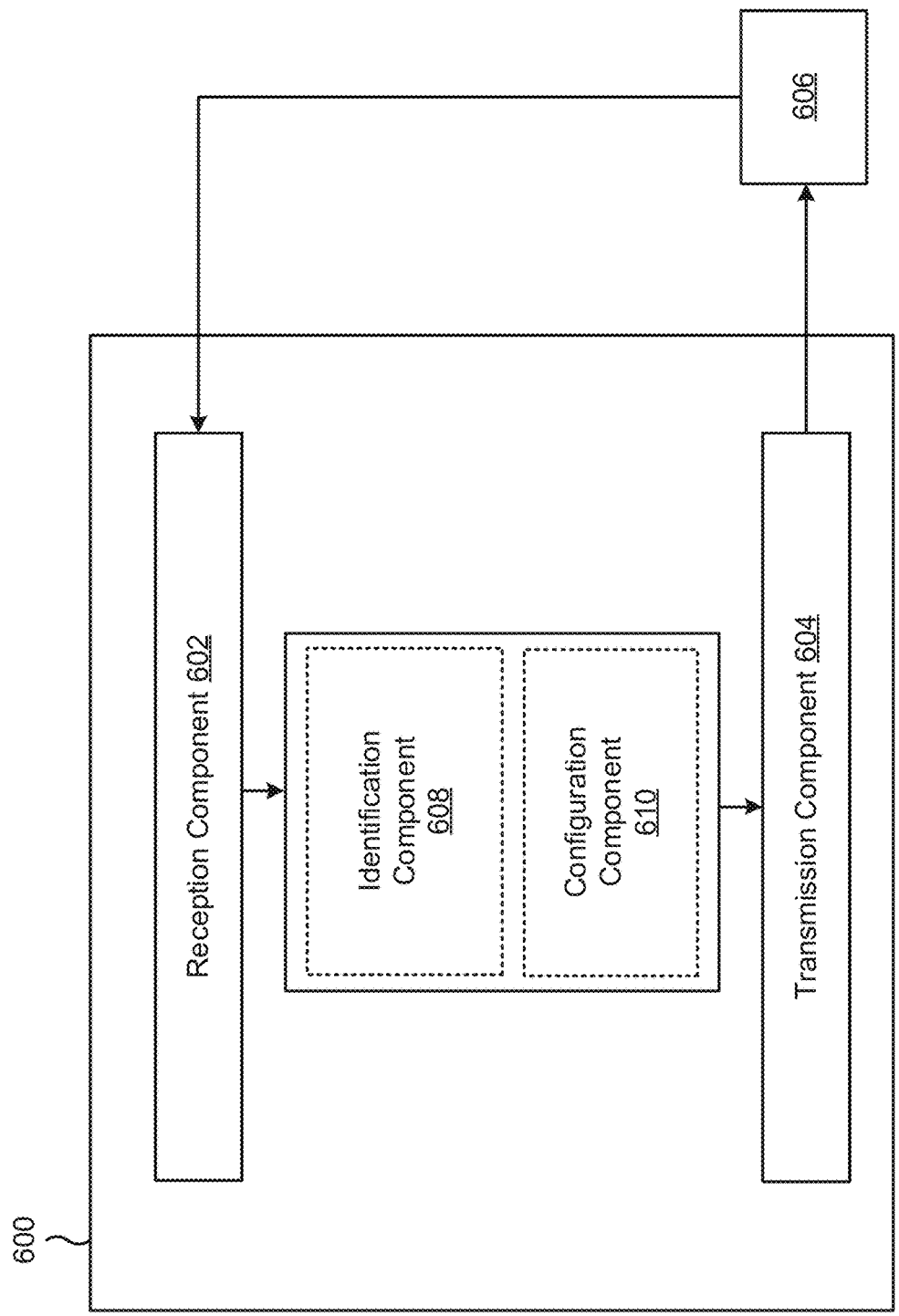
FIGS. 6 and 7 are diagrams of example apparatuses for wireless communication, in accordance with various aspects of the present disclosure.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include an identification component 608 and/or a configuration component 610, among other examples.

In some aspects, the apparatus 600 may be configured to perform one or more operations described herein in connection with FIGS. 3A-3G. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive (e.g., from the apparatus 606) a downlink communication that includes one or more codepoints indicating a plurality of TPMI indices. The identification component 608 may identify, based at least in part on the one or more codepoints, a first TPMI index, of the plurality of TPMI indices, for a first repetition of a PUSCH transmission, where the PUSCH transmission is a codebook-based PUSCH transmission.

The identification component 608 may identify, based at least in part on the SRI codepoint, a first SRS resource of a plurality of SRS resources, for the first repetition of the PUSCH transmission. The identification component 608 may identify for a second repetition of the PUSCH transmission, a second TPMI index of the plurality of TPMI indices based at least in part on the one or more codepoints, and a second SRS resource of the plurality of SRS resources based at least in part on the SRI codepoint. The identification component 608 may identify, for a third repetition of the PUSCH transmission the first TPMI index, and the first SRS resource, the first TPMI index and the first SRS resource.

The configuration component 610 may configure respective redundancy versions for the first repetition of the PUSCH transmission and for the third repetition of the PUSCH transmission based at least in part on a redundancy version sequence. The configuration component 610 may configure a redundancy version for the second repetition of the PUSCH transmission based at least in part on an offset value applied to the redundancy version sequence.

The identification component 608 may identify spatial relation information, associated with the first SRS resource, as a spatial domain transmission filter to be used for the first repetition of the PUSCH transmission. The identification component 608 may identify spatial relation information, associated with the second SRS resource, as a spatial domain transmission filter to be used for the second repetition of the PUSCH transmission.

The identification component 608 may identify, based at least in part on the one or more codepoints, a second TPMI index, of the plurality of TPMI indices, for a second repetition of the PUSCH transmission. The identification component 608 may identify, based at least in part on the SRI codepoint, an SRS resource of the one or more SRS resources for the first repetition of the PUSCH transmission and for the second repetition of the PUSCH transmission. The identification component 608 may identify spatial relation information, associated with the SRS resource, as a spatial domain transmission filter to be used for the first repetition of the PUSCH transmission and for the second repetition of the PUSCH transmission.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
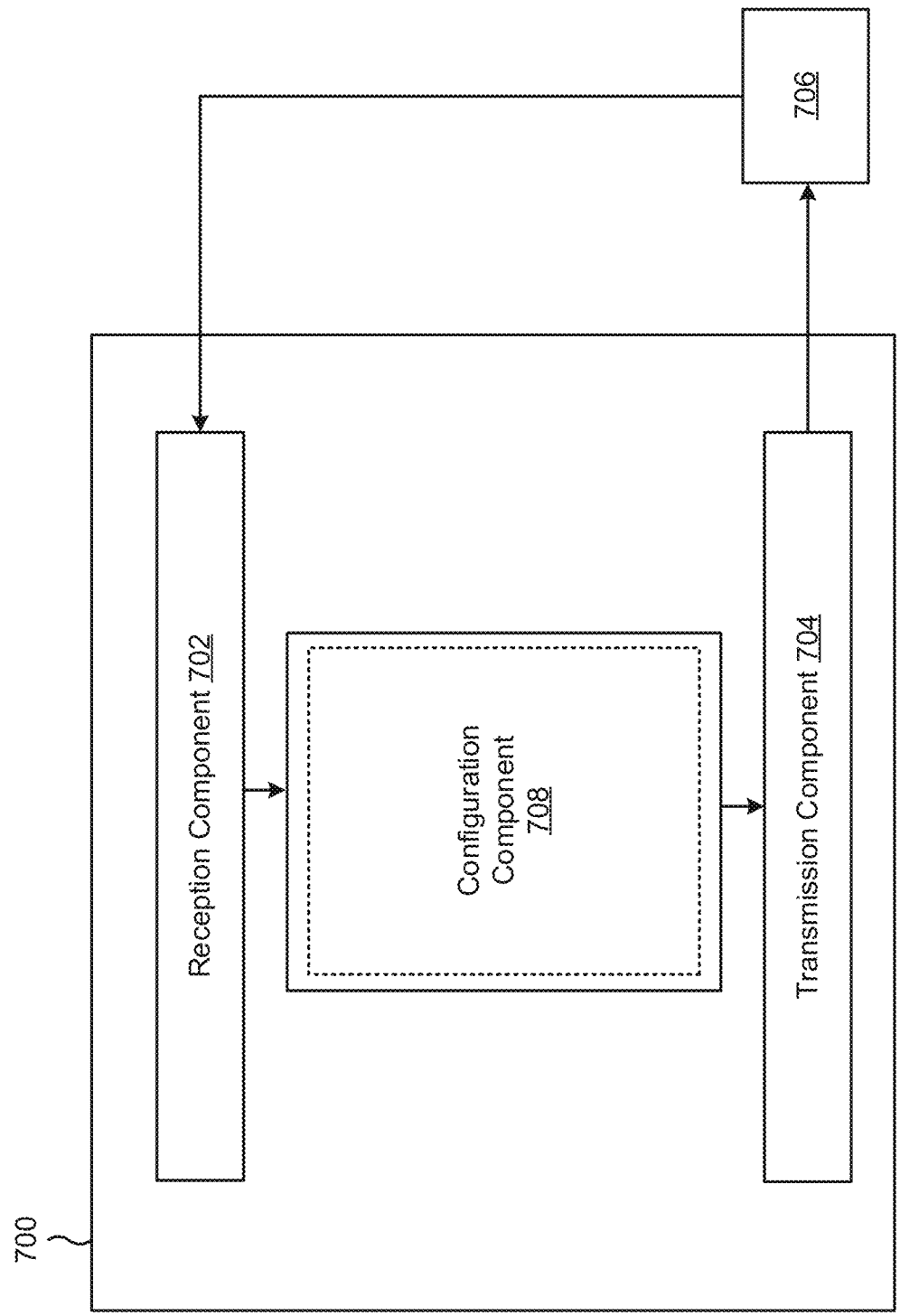

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a configuration component 708.

In some aspects, the apparatus 700 may be configured to perform one or more operations described herein in connection with FIGS. 3A-3G. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive (e.g., from the apparatus 706) a downlink communication that schedules a first set of repetitions of a PUSCH transmission associated with a first uplink beam and a second set of repetitions of the PUSCH transmission associated with a second uplink beam. The configuration component 708 may configure respective redundancy versions for the first set of repetitions based at least in part on a first redundancy version sequence associated with the first uplink beam. The configuration component 708 may configure respective redundancy versions for the second set of repetitions based at least in part on a second redundancy version sequence associated with the second uplink beam.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a user equipment (UE), comprising: receiving a downlink communication that includes one or more codepoints indicating a plurality of transmit precoder matrix indicator (TPMI) indices; and identifying, based at least in part on the one or more codepoints, a first TPMI index, of the plurality of TPMI indices, for a first repetition of a physical uplink shared channel (PUSCH) transmission, wherein the PUSCH transmission is a codebook-based PUSCH transmission.

Aspect 2: The method of aspect 1, wherein the one or more codepoints include: a first codepoint, in a first Precoding Information and Number of Layers field of the downlink communication, indicating the first TPMI index, and a second codepoint, in a second Precoding Information and Number of Layers field of the downlink communication, indicating a second TPMI index of the plurality of TPMI indices. Aspect 3: The method of aspect 1, wherein the one or more codepoints includes a single codepoint, in a Precoding Information and Number of Layers field of the downlink communication, indicating the plurality of TPMI indices; and wherein the method further comprises: identifying, based at least in part on the one or more codepoints, a second TPMI index, of the plurality of TPMI indices, for a second repetition of the PUSCH transmission.

Aspect 4: The method of aspect 3, wherein the codepoint indicates a same quantity of layers for the first repetition of the PUSCH transmission and the second repetition of the PUSCH transmission. Aspect 5: The method of aspect 3 or 4, wherein an order of the first TPMI index and the second TPMI index is indicated by a row in a table associated with a value indicated by the codepoint. Aspect 6: The method of aspect 5, wherein a reverse order of the first TPMI index and the second TPMI index is indicated by another row in the table associated with another codepoint value.

Aspect 7: The method of any of aspects 3-6, wherein identifying the first TPMI index and the second TPMI index comprises: identifying, based at least in part on a value indicated by the codepoint, a row in a table specifying the first TPMI index and the second TPMI index, wherein identifying the first TPMI index and the second TPMI index comprises: identifying the row from a subset of rows of the table indicated in: a radio resource control communication, or a medium access control element communication.

Aspect 8: The method of any of aspects 1-7, wherein the downlink communication includes a sounding reference signal (SRS) resource indicator (SRI) codepoint that indicates one or more SRS resources, having a usage set to codebook, for the PUSCH transmission. Aspect 9: The method of aspect 8, further comprising: identifying, based at least in part on the SRI codepoint, a first SRS resource of, a plurality of SRS resources, for the first repetition of the PUSCH transmission; identifying, for a second repetition of the PUSCH transmission: a second TPMI index of the plurality of TPMI indices based at least in part on the one or more codepoints, and a second SRS resource of the plurality of SRS resources based at least in part on the SRI codepoint; and identifying, for a third repetition of the PUSCH transmission: the first TPMI index, and the first SRS resource.

Aspect 10: The method of aspect 9, wherein a mapping of the first TPMI index and the first SRS resource to the first repetition and to the third repetition, and a mapping of the second TPMI index and the second SRS resource to the second repetition, are based at least in part on a mapping for the first TPMI index, the first SRS resource, the second TPMI index, and the second SRS resource indicated in: a radio resource control communication, or a downlink control information communication. Aspect 11: The method of aspect 9 or 10, further comprising: configuring respective redundancy versions for the first repetition of the PUSCH transmission and for the third repetition of the PUSCH transmission based at least in part on a redundancy version sequence; and configuring a redundancy version for the second repetition of the PUSCH transmission based at least in part on an offset value applied to the redundancy version sequence.

Aspect 12: The method of any of aspects 9-11, wherein the PUSCH transmission is configured by an uplink configured grant configuration; wherein the downlink communication is a radio resource control (RRC) communication configuring the uplink configured grant configuration; wherein the one or more codepoints are indicated in a preocdingAndNumberOfLayers field in the RRC communication; and wherein the SRI codepoint is indicated in an srs-ResourceIndicator field in the RRC communication. Aspect 13: The method of any of aspects 9-12, wherein the PUSCH transmission is configured by an uplink configured grant configuration via a radio resource control communication; wherein the downlink communication is a downlink control information (DCI) communication that activates the uplink configured grant configuration; wherein the one or more codepoints are indicated in a Precoding Information and Number of Layers field in the DCI communication; and wherein the SRI codepoint is indicated in an SRI field in the DCI communication.

Aspect 14: The method of any of aspects 9-13, wherein a mapping of the first TPMI index and the first SRS resource to the first repetition and to the third repetition, and a mapping of the second TPMI index and the second SRS resource to the second repetition, are based at least in part on a fixed alternating mapping for the first TPMI index, the first SRS resource, the second TPMI index, and the second SRS resource.

Aspect 15: The method of aspect 8, wherein the SRI codepoint indicates a plurality of SRS resources; and wherein the method further comprises: identifying, based at least in part on the one or more codepoints, a second TPMI index, of the plurality of TPMI indices, for a second repetition of the PUSCH transmission; and identifying, based at least in part on the SRI codepoint: a first SRS resource of, the plurality of SRS resources, for the first repetition of the PUSCH transmission, and a second SRS resource, of the plurality of SRS resources, for a second repetition of the PUSCH transmission. Aspect 16: The method of aspect 15, wherein an order of the first SRS resource and the second SRS resource is indicated by a row in a table associated with a value indicated by the SRI codepoint; and wherein a reverse order of the first SRS resource and the second SRS resource is indicated by another row in the table associated with another SRI codepoint value.

Aspect 17: The method of aspect 15 or 16, wherein identifying the first SRS resource and the second SRS resource comprises: identifying, based at least in part on a value indicated by the SRI codepoint, a row in a table specifying the first SRS resource and the second SRS resource. Aspect 18: The method of any of aspect 15-17, further comprising: identifying spatial relation information, associated with the first SRS resource, as a spatial domain transmission filter to be used for the first repetition of the PUSCH transmission; and identifying spatial relation information, associated with the second SRS resource, as a spatial domain transmission filter to be used for the second repetition of the PUSCH transmission.

Aspect 19: The method of aspect 8 wherein the SRI codepoint indicates a single SRS resource; and wherein the method further comprises: identifying, based at least in part on the SRI codepoint, the SRS resource for the first repetition of the PUSCH transmission and a second repetition of the PUSCH transmission. Aspect 20: The method of aspect 19, wherein identifying the first TPMI index comprises: identifying, based at least in part on a value indicated by a codepoint of the one or more codepoints, a row in a first table specifying the first TPMI index, or identifying, based at least in part on a value indicated by the codepoint, a row in a first table specifying the plurality of TPMI indices, wherein the first TPMI index is listed first among the plurality of TPMI indices in the row.

Aspect 21: The method of any of aspects 8-20, further comprising: identifying, based at least in part on the one or more codepoints, a second TPMI index, of the plurality of TPMI indices, for a second repetition of the PUSCH transmission; identifying, based at least in part on the SRI codepoint, an SRS resource of the one or more SRS resources for the first repetition of the PUSCH transmission and for the second repetition of the PUSCH transmission; and identifying spatial relation information, associated with the SRS resource, as a spatial domain transmission filter to be used for the first repetition of the PUSCH transmission and for the second repetition of the PUSCH transmission. Aspect 22: The method of aspect 21, wherein the SRS resource is identified, in a radio resource control communication, among a plurality of candidate SRS resources that are permitted to be associated with multiple TPMIs.

Aspect 23: The method of aspect 21 or 22, wherein the SRS resource is associated with the first TPMI index and the second TPMI index; and wherein identifying the first TPMI index and the second TPMI index comprises: identifying, based at least in part on a value indicated by the one or more codepoints, a row in a table specifying the first TPMI index and the second TPMI index. Aspect 24: The method of aspect 8, wherein the SRI codepoint indicates a single SRS resource; wherein the method further comprises: identifying, based at least in part on the SRI codepoint, the SRS resource for the first repetition of the PUSCH transmission and a second repetition of the PUSCH transmission; and wherein identifying the first TPMI index comprises: identifying, based at least in part on a value indicated by a codepoint of the one or more codepoints, a row in a first table specifying the first TPMI index, or identifying, based at least in part on a value indicated by the codepoint, a row in a first table specifying the plurality of TPMI indices, wherein the first TPMI index is listed first among the plurality of TPMI indices in the row.

Aspect 25: The method of any of aspects 8-24, wherein the SRI codepoint is configurable by radio resource control signaling to indicate one SRS resource or a plurality of SRS resources based at least in part on a UE capability of the UE. Aspect 26: The method of any of aspects 8-25, wherein the downlink communication is a downlink control information (DCI) communication; wherein the one or more codepoints are indicated in a Precoding Information and Number of Layers field in the DCI communication; and wherein the SRI codepoint is indicated in an SRI field in the DCI communication.

Aspect 27: An apparatus for wireless communication at a device, comprising a processor; memory coupled with the processor; and instructions stored in the memory and executable by the processor to cause the apparatus to perform the method of one or more aspects of aspects 1-26. Aspect 28: A device for wireless communication, comprising a memory and one or more processors coupled to the memory, the memory and the one or more processors configured to perform the method of one or more aspects of aspects 1-26.

Aspect 29: An apparatus for wireless communication, comprising at least one means for performing the method of one or more aspects of aspects 1-26. Aspect 30: A non-transitory computer-readable medium storing code for wireless communication, the code comprising instructions executable by a processor to perform the method of one or more aspects of aspects 1-26. Aspect 31: A non-transitory computer-readable medium storing a set of instructions for wireless communication, the set of instructions comprising one or more instructions that, when executed by one or more processors of a device, cause the device to perform the method of one or more aspects of aspects 1-26.

Aspect 32: A method of wireless communication performed by a user equipment (UE), comprising: receiving a downlink communication that schedules a first set of repetitions of a physical uplink shared channel (PUSCH) transmission associated with a first uplink beam and a second set of repetitions of the PUSCH transmission associated with a second uplink beam; configuring respective redundancy versions for the first set of repetitions based at least in part on a first redundancy version sequence associated with the first uplink beam; and configuring respective redundancy versions for the second set of repetitions based at least in part on a second redundancy version sequence associated with the second uplink beam. Aspect 33: The method of aspect 32, wherein the second redundancy sequence comprises the first redundancy sequence having a starting point that is shifted based at least in part on a redundancy version offset.

Aspect 34: An apparatus for wireless communication at a device, comprising a processor; memory coupled with the processor; and instructions stored in the memory and executable by the processor to cause the apparatus to perform the method of one or more aspects of aspects 32 or 33. Aspect 35: A device for wireless communication, comprising a memory and one or more processors coupled to the memory, the memory and the one or more processors configured to perform the method of one or more aspects of aspects 32 or 33.

Aspect 36: An apparatus for wireless communication, comprising at least one means for performing the method of one or more aspects of aspects 32 or 33. Aspect 37: A non-transitory computer-readable medium storing code for wireless communication, the code comprising instructions executable by a processor to perform the method of one or more aspects of aspects 32 or 33. Aspect 38: A non-transitory computer-readable medium storing a set of instructions for wireless communication, the set of instructions comprising one or more instructions that, when executed by one or more processors of a device, cause the device to perform the method of one or more aspects of aspects 32 or 33.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a downlink communication that includes one or more codepoints indicating a plurality of transmit precoder matrix indicator (TPMI) indices; and
   identifying, based at least in part on the one or more codepoints, a first TPMI index, of the plurality of TPMI indices, for a first repetition of a physical uplink shared channel (PUSCH) transmission,
      wherein the PUSCH transmission is a codebook-based PUSCH transmission.

2. The method of claim 1, wherein the one or more codepoints include:
   a first codepoint, in a first Precoding Information and Number of Layers field of the downlink communication, indicating the first TPMI index, and
   a second codepoint, in a second Precoding Information and Number of Layers field of the downlink communication, indicating a second TPMI index of the plurality of TPMI indices.

3. The method of claim 1, wherein the one or more codepoints includes a single codepoint, in a Precoding Information and Number of Layers field of the downlink communication, indicating the plurality of TPMI indices; and
   wherein the method further comprises:
      identifying, based at least in part on the one or more codepoints, a second TPMI index, of the plurality of TPMI indices, for a second repetition of the PUSCH transmission.

4. The method of claim 3, wherein the codepoint indicates a same quantity of layers for the first repetition of the PUSCH transmission and the second repetition of the PUSCH transmission.

5. The method of claim 3, wherein an order of the first TPMI index and the second TPMI index is indicated by a row in a table associated with a value indicated by the codepoint.

6. The method of claim 5, wherein a reverse order of the first TPMI index and the second TPMI index is indicated by another row in the table associated with another codepoint value.

7. The method of claim 3, wherein identifying the first TPMI index and the second TPMI index comprises:
   identifying, based at least in part on a value indicated by the codepoint, a row in a table specifying the first TPMI index and the second TPMI index,
      wherein identifying the first TPMI index and the second TPMI index comprises:
         identifying the row from a subset of rows of the table indicated in:
            a radio resource control communication, or
            a medium access control element communication.

8. The method of claim 1, wherein the downlink communication includes a sounding reference signal (SRS) resource indicator (SRI) codepoint that indicates one or more SRS resources, having a usage set to codebook, for the PUSCH transmission.

9. The method of claim 8, further comprising:
identifying, based at least in part on the SRI codepoint, a first SRS resource of, a plurality of SRS resources, for the first repetition of the PUSCH transmission;
identifying, for a second repetition of the PUSCH transmission:
a second TPMI index of the plurality of TPMI indices based at least in part on the one or more codepoints, and
a second SRS resource of the plurality of SRS resources based at least in part on the SRI codepoint; and
identifying, for a third repetition of the PUSCH transmission:
the first TPMI index, and
the first SRS resource.

10. The method of claim 9, wherein a mapping of the first TPMI index and the first SRS resource to the first repetition and to the third repetition, and a mapping of the second TPMI index and the second SRS resource to the second repetition, are based at least in part on a mapping for the first TPMI index, the first SRS resource, the second TPMI index, and the second SRS resource indicated in:
a radio resource control communication, or
a downlink control information communication.

11. The method of claim 9, further comprising:
configuring respective redundancy versions for the first repetition of the PUSCH transmission and for the third repetition of the PUSCH transmission based at least in part on a redundancy version sequence; and
configuring a redundancy version for the second repetition of the PUSCH transmission based at least in part on an offset value applied to the redundancy version sequence.

12. The method of claim 9, wherein the PUSCH transmission is configured by an uplink configured grant configuration;
wherein the downlink communication is a radio resource control (RRC) communication configuring the uplink configured grant configuration;
wherein the one or more codepoints are indicated in a preocdingAndNumberOfLayers field in the RRC communication; and
wherein the SRI codepoint is indicated in an srs-ResourceIndicator field in the RRC communication.

13. The method of claim 9, wherein the PUSCH transmission is configured by an uplink configured grant configuration via a radio resource control communication;
wherein the downlink communication is a downlink control information (DCI) communication that activates the uplink configured grant configuration;
wherein the one or more codepoints are indicated in a Precoding Information and Number of Layers field in the DCI communication; and
wherein the SRI codepoint is indicated in an SRI field in the DCI communication.

14. The method of claim 9, wherein a mapping of the first TPMI index and the first SRS resource to the first repetition and to the third repetition, and a mapping of the second TPMI index and the second SRS resource to the second repetition, are based at least in part on a fixed alternating mapping for the first TPMI index, the first SRS resource, the second TPMI index, and the second SRS resource.

15. The method of claim 8, wherein the SRI codepoint indicates a plurality of SRS resources; and
wherein the method further comprises:
identifying, based at least in part on the one or more codepoints, a second TPMI index, of the plurality of TPMI indices, for a second repetition of the PUSCH transmission; and
identifying, based at least in part on the SRI codepoint:
a first SRS resource of, the plurality of SRS resources, for the first repetition of the PUSCH transmission, and
a second SRS resource, of the plurality of SRS resources, for a second repetition of the PUSCH transmission.

16. The method of claim 15, wherein an order of the first SRS resource and the second SRS resource is indicated by a row in a table associated with a value indicated by the SRI codepoint; and
wherein a reverse order of the first SRS resource and the second SRS resource is indicated by another row in the table associated with another SRI codepoint value.

17. The method of claim 15, wherein identifying the first SRS resource and the second SRS resource comprises:
identifying, based at least in part on a value indicated by the SRI codepoint, a row in a table specifying the first SRS resource and the second SRS resource.

18. The method of claim 15, further comprising:
identifying spatial relation information, associated with the first SRS resource, as a spatial domain transmission filter to be used for the first repetition of the PUSCH transmission; and
identifying spatial relation information, associated with the second SRS resource, as a spatial domain transmission filter to be used for the second repetition of the PUSCH transmission.

19. The method of claim 8 wherein the SRI codepoint indicates a single SRS resource; and
wherein the method further comprises:
identifying, based at least in part on the SRI codepoint, the SRS resource for the first repetition of the PUSCH transmission and a second repetition of the PUSCH transmission.

20. The method of claim 19, wherein identifying the first TPMI index comprises:
identifying, based at least in part on a value indicated by a codepoint of the one or more codepoints, a row in a first table specifying the first TPMI index, or
identifying, based at least in part on a value indicated by the codepoint, a row in a first table specifying the plurality of TPMI indices,
wherein the first TPMI index is listed first among the plurality of TPMI indices in the row.

21. The method of claim 8, further comprising:
identifying, based at least in part on the one or more codepoints, a second TPMI index, of the plurality of TPMI indices, for a second repetition of the PUSCH transmission;
identifying, based at least in part on the SRI codepoint, an SRS resource of the one or more SRS resources for the first repetition of the PUSCH transmission and for the second repetition of the PUSCH transmission; and
identifying spatial relation information, associated with the SRS resource, as a spatial domain transmission filter to be used for the first repetition of the PUSCH transmission and for the second repetition of the PUSCH transmission.

22. The method of claim 21, wherein the SRS resource is identified, in a radio resource control communication, among a plurality of candidate SRS resources that are permitted to be associated with multiple TPMIs.

23. The method of claim 21, wherein the SRS resource is associated with the first TPMI index and the second TPMI index; and
  wherein identifying the first TPMI index and the second TPMI index comprises:
    identifying, based at least in part on a value indicated by the one or more codepoints, a row in a table specifying the first TPMI index and the second TPMI index.

24. The method of claim 8, wherein the SRI codepoint indicates a single SRS resource;
  wherein the method further comprises:
    identifying, based at least in part on the SRI codepoint, the SRS resource for the first repetition of the PUSCH transmission and a second repetition of the PUSCH transmission; and
  wherein identifying the first TPMI index comprises:
    identifying, based at least in part on a value indicated by a codepoint of the one or more codepoints, a row in a first table specifying the first TPMI index, or
    identifying, based at least in part on a value indicated by the codepoint, a row in a first table specifying the plurality of TPMI indices,
      wherein the first TPMI index is listed first among the plurality of TPMI indices in the row.

25. The method of claim 8, wherein the SRI codepoint is configurable by radio resource control signaling to indicate one SRS resource or a plurality of SRS resources based at least in part on a UE capability of the UE.

26. The method of claim 8, wherein the downlink communication is a downlink control information (DCI) communication;
  wherein the one or more codepoints are indicated in a Precoding Information and Number of Layers field in the DCI communication; and
  wherein the SRI codepoint is indicated in an SRI field in the DCI communication.

27. A user equipment (UE) for wireless communication, comprising:
  a memory; and
  one or more processors, coupled to the memory, configured to:
    receive a downlink communication that includes one or more codepoints indicating a plurality of transmit precoder matrix indicator (TPMI) indices; and
    identify, based at least in part on the one or more codepoints, a first TPMI index, of the plurality of TPMI indices, for a first repetition of a physical uplink shared channel (PUSCH) transmission,
      wherein the PUSCH transmission is a codebook-based PUSCH transmission.

28. A method of wireless communication performed by a user equipment (UE), comprising:
  receiving a downlink communication that schedules a first set of repetitions of a physical uplink shared channel (PUSCH) transmission associated with a first uplink beam and a second set of repetitions of the PUSCH transmission associated with a second uplink beam;
  configuring respective redundancy versions for the first set of repetitions based at least in part on a first redundancy version sequence associated with the first uplink beam; and
  configuring respective redundancy versions for the second set of repetitions based at least in part on a second redundancy version sequence associated with the second uplink beam.

29. The method of claim 28, wherein the second redundancy sequence comprises the first redundancy sequence having a starting point that is shifted based at least in part on a redundancy version offset.

30. A user equipment (UE) for wireless communication, comprising:
  a memory; and
  one or more processors, coupled to the memory, configured to:
    receive a downlink communication that schedules a first set of repetitions of a physical uplink shared channel (PUSCH) transmission associated with a first uplink beam and a second set of repetitions of the PUSCH transmission associated with a second uplink beam;
    configure respective redundancy versions for the first set of repetitions based at least in part on a first redundancy version sequence associated with the first uplink beam; and
    configure respective redundancy versions for the second set of repetitions based at least in part on a second redundancy version sequence associated with the second uplink beam.

* * * * *